United States Patent [19]
VanDenberg

[11] Patent Number: 5,238,266
[45] Date of Patent: * Aug. 24, 1993

[54] LANDING GEAR FOR SEMITRAILERS

[75] Inventor: Ervin VanDenberg, North Canton, Ohio

[73] Assignee: Jost International of Grand Haven, Michigan, Grand Haven, Mich.

[ * ] Notice: The portion of the term of this patent subsequent to Apr. 6, 2010 has been disclaimed.

[21] Appl. No.: 714,709

[22] Filed: Jun. 13, 1991

Related U.S. Application Data

[63] Continuation-in-part of Ser. No. 685,836, Apr. 16, 1991, Pat. No. 5,199,738.

[51] Int. Cl.⁵ .............................................. B60S 9/08
[52] U.S. Cl. .................. 280/766.1; 74/342; 74/343; 248/188.4
[58] Field of Search ............... 280/763.1, 766.1, 43, 280/43.22, 43.13; 74/342, 343, 344, 345, 665 F, 665 GA, 665 G; 192/67 R; 248/352, 188.4, 650

[56] References Cited

U.S. PATENT DOCUMENTS 3,675,497  7/1972  Thomas ............................ 192/67 R
3,892,141  7/1975  Phillips, Jr. et al. .................. 74/342

FOREIGN PATENT DOCUMENTS 0398705  5/1990  European Pat. Off. .

OTHER PUBLICATIONS

A sales brochure entitled "Contender TM ", from Binkley, Transportation Products Division, Warrenton, Mo. 63383.
A sales brochure entitled "Fruehauf Supports" available from Fruehauf Corporation, Detroit, Mich.
A sales brochure entitled "Kwik Shift TM Round and Square Leg Trailer Supports," Models CMR and CMS available from Kysor/Westran, P.O. Box 921, Byron, Ill. 61010-0921.
A sales brochure entitled "Mark V Landing Gears and Accessories," available from Holland Hitch Company, Holland, Mich.
A parts drawing of unknown origin, labelled "Exhibit U", showing a landing gear assembly.

*Primary Examiner*—Eric D. Culbreth
*Attorney, Agent, or Firm*—Hudak & Shunk Co.

[57] ABSTRACT

A landing gear for semitrailers includes a two speed double reduction gear assembly having fewer, smaller, and simpler parts, resulting in a compact double reduction gear assembly housed in a relatively small gear box or entirely within one of the landing gear legs, which is a cost efficient landing gear unit with a unique clutch-shifting mechanism to provide for shifting from one ratio to another. The double reduction gear assembly is disposed on and about in-line input and output shafts further resulting in an easy to crank and shift landing gear unit capable of achieving standard crank handle turn to vertical leg travel distance ratios. The low gear or low speed ratio of the landing gear unit can be varied within a broad range during manufacture, if desired, generally without increasing the overall size or complexity of the two speed double reduction gear assembly. The landing gear can further include a universal mounting feature and is durable and simple to use.

18 Claims, 23 Drawing Sheets

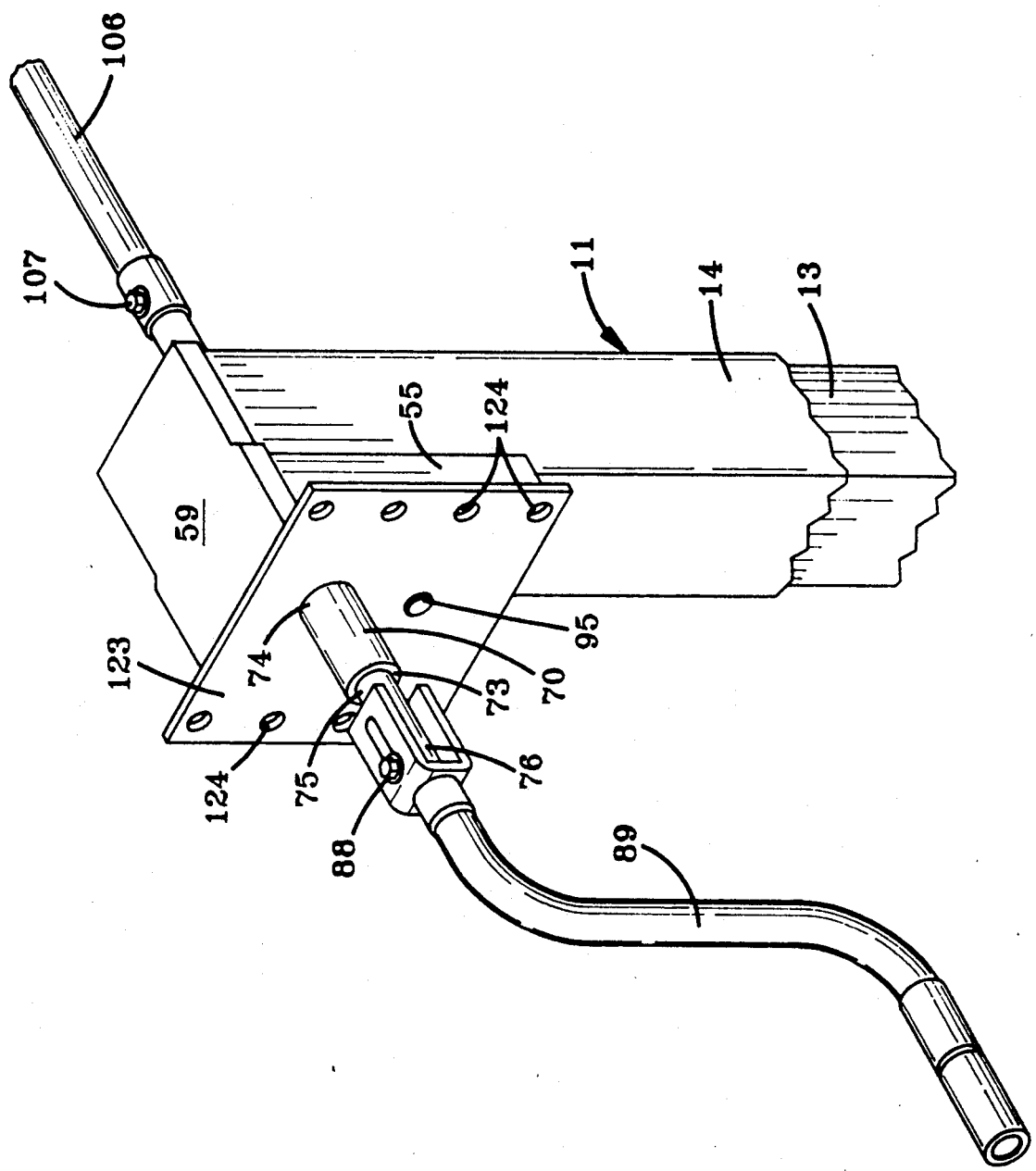

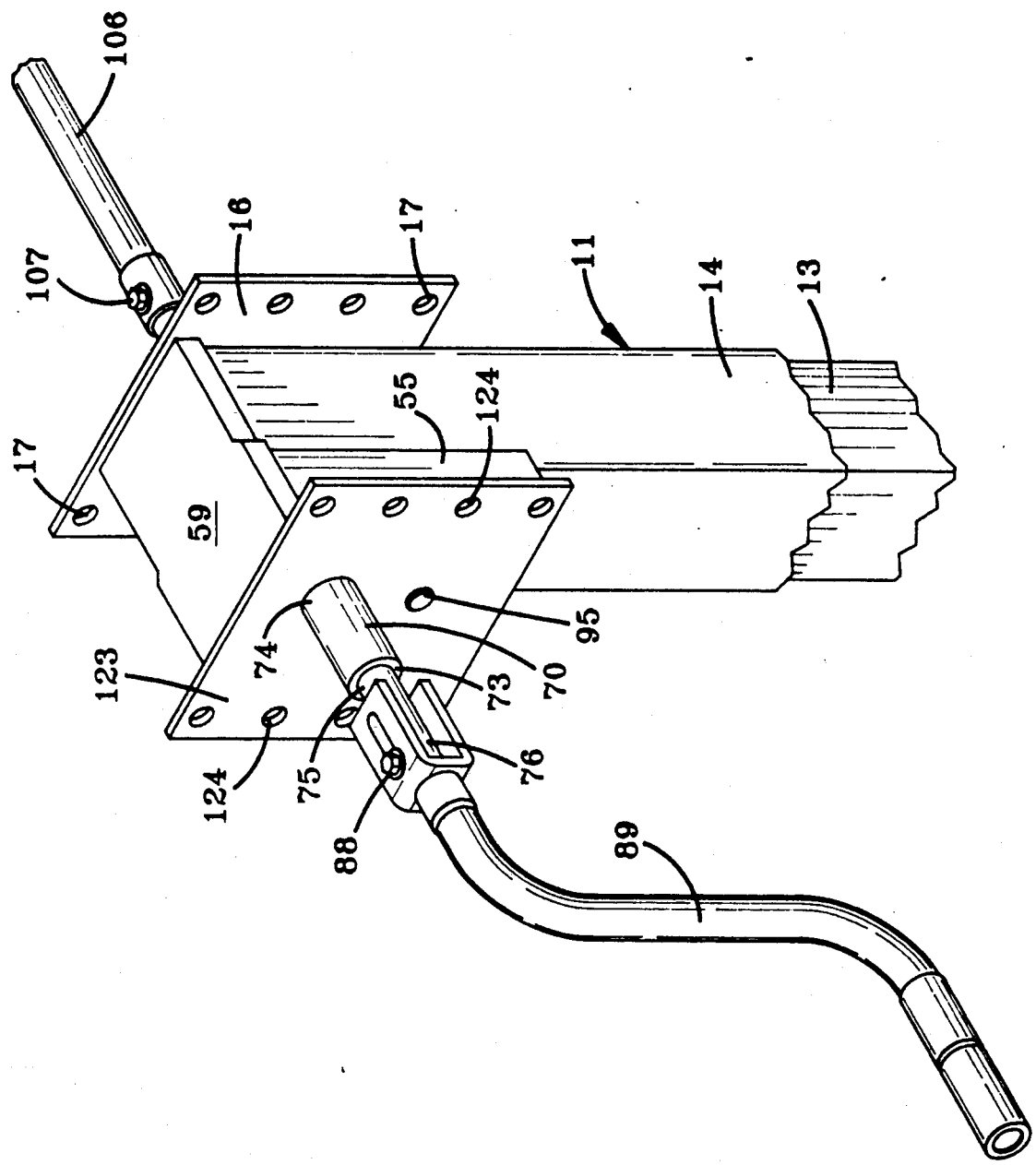

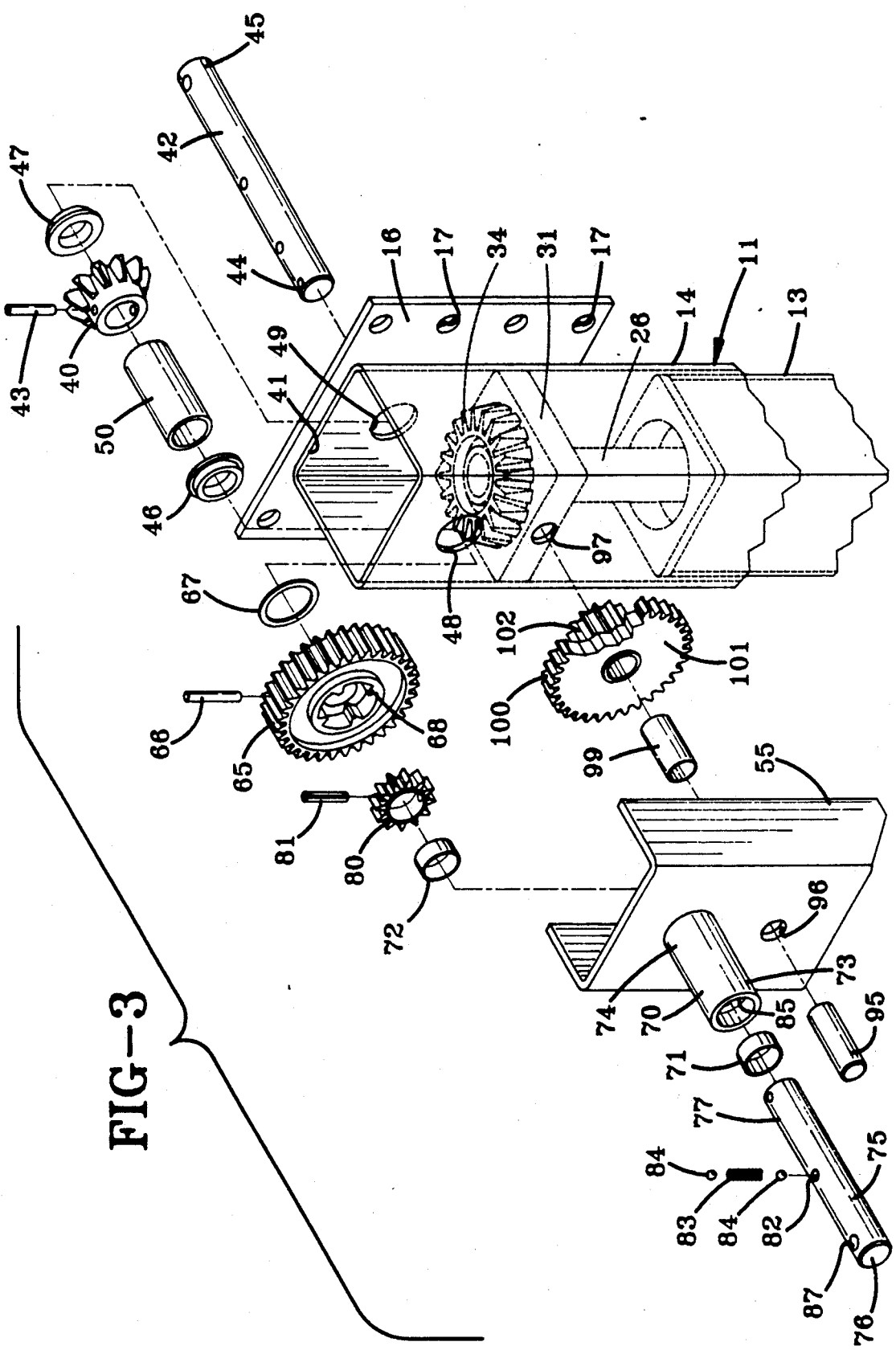

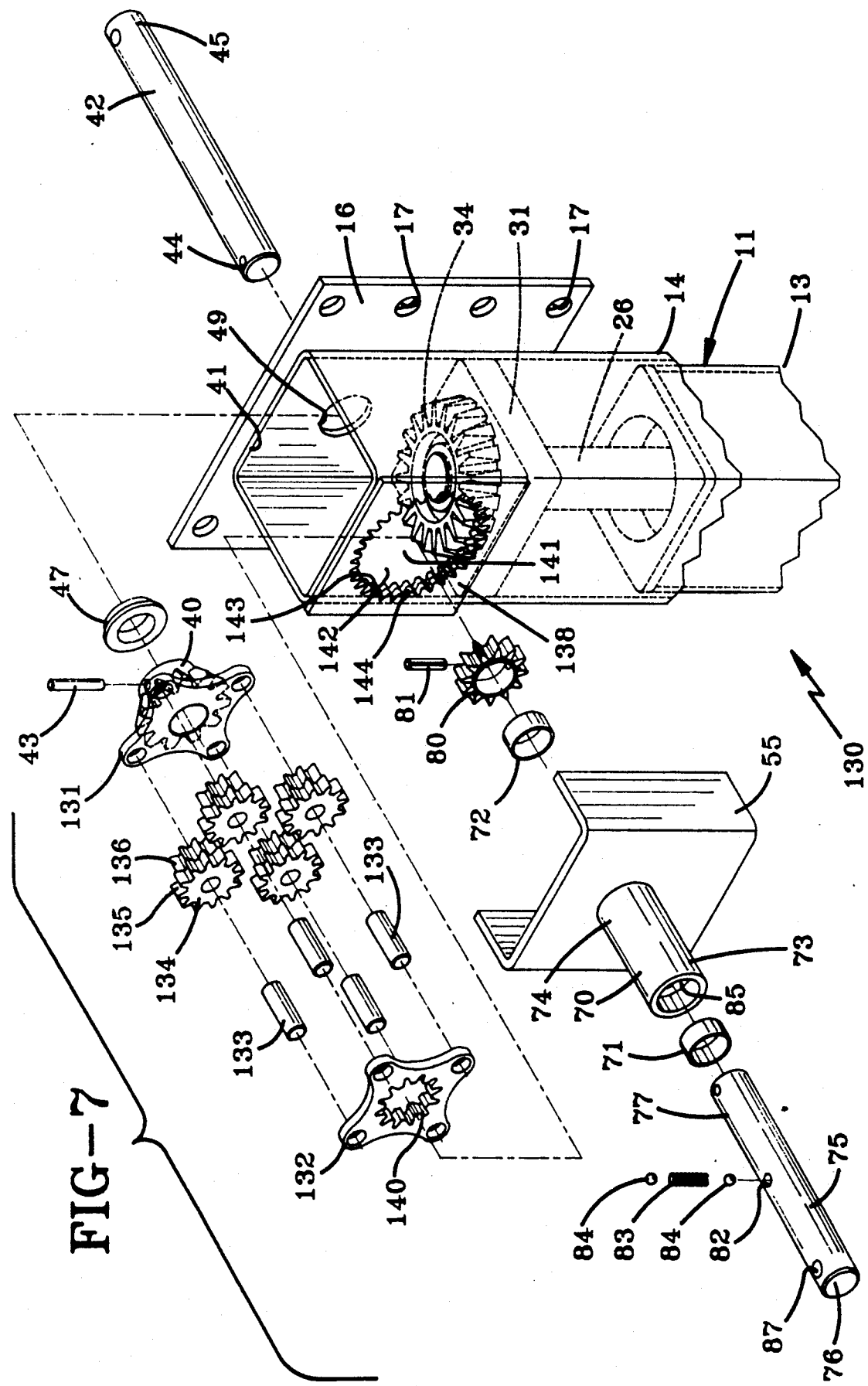

LANDING GEAR FOR SEMITRAILERS

CROSS REFERENCES

This application is a continuation-in-part of U.S. Ser. No. 07/685,836, filed Apr. 16, 1991, for "Landing Gear for Semitrailers" now U.S. Pat. No. 5,199,738.

FIELD OF THE INVENTION

The invention relates to landing gear for semitrailers, and in particular to a landing gear having a double reduction gear assembly. More particularly, the invention relates to such a landing gear which achieves standard crank handle turn to vertical travel distance ratios with a two-speed double reduction gear assembly, which utilizes fewer, simpler and smaller parts to achieve such standard ratios resulting in a relatively compact, cost-effective double reduction gear assembly featuring a unique shift-clutching mechanism. These features reduce the number of parts and reduce cost while making it easier to shift between high and low speeds.

BACKGROUND ART

Landing gear for semitrailers have heretofore been and will presumably continue to be a high volume product, with estimated sales in the United States normally exceeding 300,000 sets per year generating income of more than 50 million dollars. The high demand for landing gear is directly related to the use of semitrailers pulled by truck tractors as a primary means of shipping goods in the United States. A conventional two-speed landing gear consists of a pair of gear-driven laterally spaced telescopic legs which are mounted on and depend from a front end of the semitrailer which engages the truck tractor.

Landing gear, and particularly two-speed landing gear, are used in association with semitrailers in the following manner. A typical scenario begins with the operator of a truck tractor dropping off the semitrailer at a location such as a dock for loading or unloading of the semitrailer. This semitrailer is retrieved when loading or unloading is completed, often by another tractor. When disconnecting after positioning the semitrailer in the desired location, the truck operator manually turns a crank handle to extend the legs until the legs engage the ground. The operator typically uses the high gear or high speed of the two-speed gear assembly to quickly extend the landing gear legs from the retracted position to the extended position where the legs contact the ground. It should be noted that when the landing gear assembly is engaged in high gear, quick traversal of a vertical distance can be accomplished due to the low ratio of crank handle turns to inches of vertical leg travel distance afforded by the high gear, which ratio usually is from about 2 to about 5 depending on the unit being utilized. However, the tradeoff for such a low ratio achieved in high gear is a lower mechanical advantage than that which can be achieved in a low gear. In practical terms, this means that the truck operator cannot raise or lower a load in high gear. In low gear the ratio of crank handle turns to distance traveled is higher, usually from about 15 to about 50, but a higher mechanical advantage is enjoyed. This enables the truck operator to raise or lower loads in low gear that could not be moved in high gear, albeit at a slower pace than if such loads could be moved in high gear. In order to pull the truck tractor away from the stationary semitrailer, the operator must disengage the depending kingpin of the semitrailer from the fifth wheel of the truck tractor by disengaging the fifth wheel jaws. Since the tractor is spring-biased in an upward direction, it is desirable to raise the semitrailer to relieve some of the load allowing the tractor to pull away from the semitrailer more easily. Therefore, the operator may shift the gear assembly to low gear in order to further extend the landing gear legs and raise all or part of the load of the semitrailer from the fifth wheel. After releasing the movable jaws of the fifth wheel, the tractor is disengaged from the semitrailer.

When an operator picks up a semitrailer which has been loaded or unloaded, he or she must back the truck tractor fifth wheel under the semitrailer and engage the kingpin. If the semitrailer was resting on a stable surface such as concrete, and a similar tractor is utilized, the necessary clearance to allow coupling most likely still exists between the ground and the kingpin, and the operator merely will back the truck tractor under the semitrailer engaging the kingpin. The operator will shift the landing gear into low gear to lower the load onto the tractor, then shift into high gear and quickly retract the legs to provide clearance for vehicle operation. More particularly, the legs are positioned approximately one foot off of the ground to provide clearance for over-the-road travel. However, if the semitrailer was left on a relatively unstable surface such as soft ground or blacktop, the semitrailer legs sometimes sink into the ground under the load of the trailer between the drop off and pickup times. If this is the case, or if a higher tractor is employed, prior to backing the truck tractor under the semitrailer the operator must further extend the legs to raise the trailer to provide sufficient clearance between the ground and the kingpin. This requires the operator to shift the landing gear into low gear to gain mechanical advantage to raise the trailer. After coupling to the tractor and lowering the trailer load onto the tractor using low gear, the operator then will proceed as described above to retract the legs in high gear to position the legs for over-the-road travel.

As expected, in view of the potential income accruing from possible sales of landing gear units, manufacturers of the landing gear are continually attempting to improve their products to present a more economical landing gear having improved performance features, in order to gain a larger share of the landing gear market.

SUMMARY OF THE INVENTION

Objects of the present invention include providing a landing gear for semitrailers having a two-speed double reduction gear assembly, in which the gear assembly is comprised of fewer, smaller and simpler parts thereby making it easier to manufacture and assemble and further resulting in an assembly which is compact and can be contained in a smaller gear box or entirely within the landing gear leg, wherein all of the above factors contribute to a lower overall cost of the landing gear unit.

Another object of the invention is to provide such a landing gear which is easier to crank and shift, and which can be universally mounted on a semitrailer.

A further object of the invention is to provide such a landing gear capable of achieving commercially standard crank handle turn to vertical leg travel distance ratios, wherein the low speed ratio could be fixed within a broad range during manufacture, if desired, generally without increasing the overall size or complexity of the two-speed double reduction gear assembly.

A still further object of the invention is to provide a landing gear which is durable and simple to use.

These objects are obtained by the two speed landing gear assembly for a semitrailer of the present invention, comprising, first and second upright telescopic legs mounted in a laterally spaced relationship generally adjacent to a front end of the semitrailer, the legs each containing an elevating mechanism for extending and retracting the legs, axially in-line, laterally-oriented input and output shafts rotatably mounted on the first leg, the output shaft being operatively connected to an input shaft rotatably mounted on the second leg, and gear means for operatively connecting the input and output shafts and the elevating mechanisms, the first leg input shaft being shiftable for operating the gear means and elevating mechanism of the first leg in a high gear or high speed and a low gear or low speed, so that upon shifting the first leg input shaft into low gear, a ratio of turns of the first leg input shaft to inches of vertical travel of the legs of from about 15 to about 50 is achieved, and upon shifting the first leg input shaft into high gear, the ratio of from about 2 to about 5 is achieved.

BRIEF DESCRIPTION OF THE DRAWINGS

FIG. 1A is a fragmentary perspective view of the first embodiment of the two speed double reduction gear assembly of the cranking leg of the landing gear of the present invention, shown adapted for mounting on an inboard position on a semitrailer frame;

FIG. 1B is a fragmentary perspective view of the first embodiment of the two speed double reduction gear assembly of the cranking leg of the landing gear of the present invention, shown adapted for universal mounting either on an inboard or an outboard position on a semitrailer frame;

FIG. 3 is an exploded fragmentary perspective view, with portions broken away and hidden parts shown by dashed lines, of the gear assembly of FIG. 2;

FIG. 7 is an exploded fragmentary perspective view, with hidden parts shown by dashed lines, of a second embodiment of the two speed double reduction gear assembly of the cranking leg of the landing gear of the present invention, shown adapted for mounting on an outboard position on a semitrailer frame;

Similar numerals refer to similar parts throughout the drawings.

DETAILED DESCRIPTION OF THE INVENTION

Figure 1:
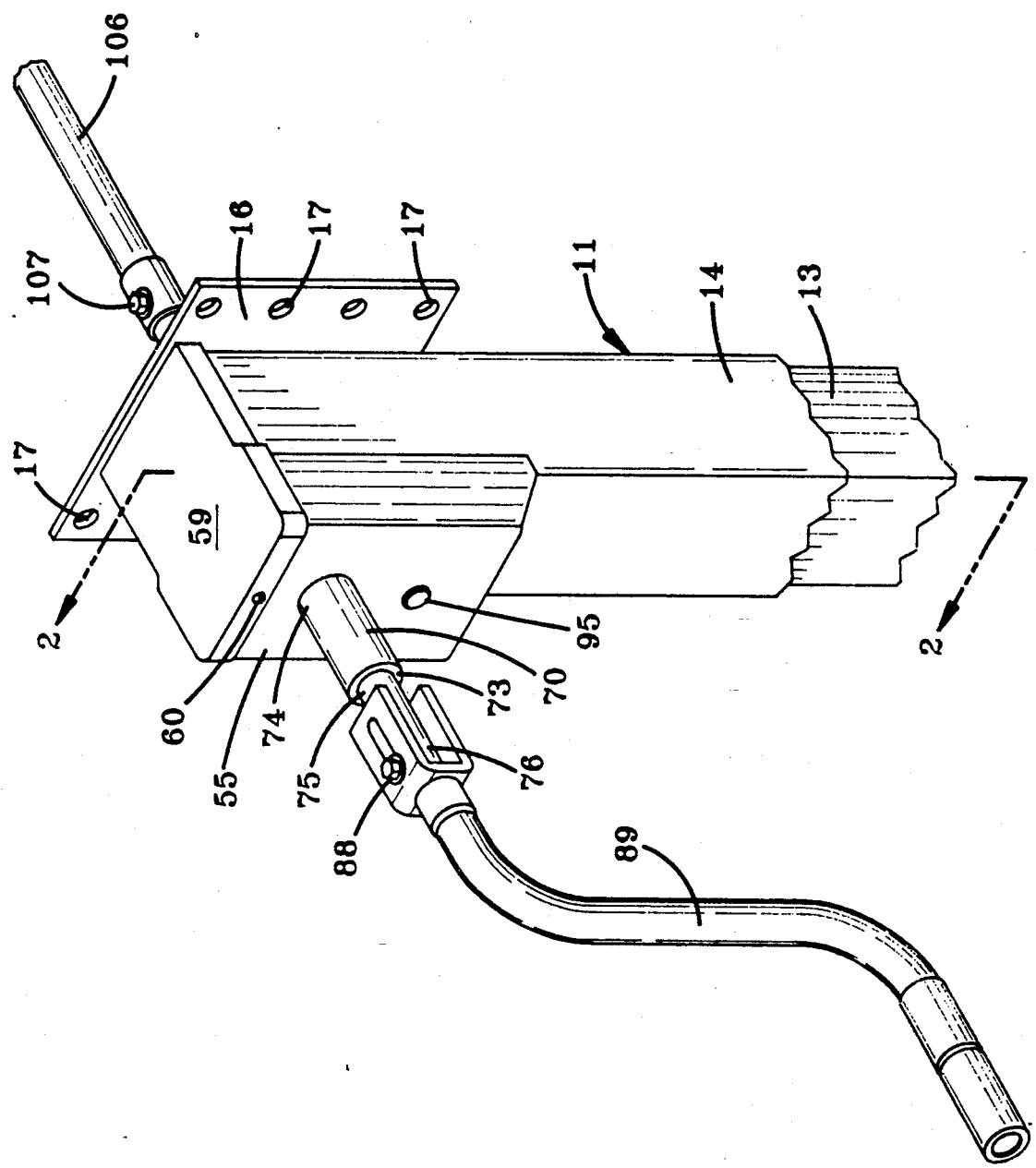
FIG. 1 is a fragmentary perspective view of a first embodiment of the two speed double reduction gear assembly of the cranking leg of the landing gear of the present invention, shown adapted for mounting on an outboard position on a semitrailer frame.
Figure 5:
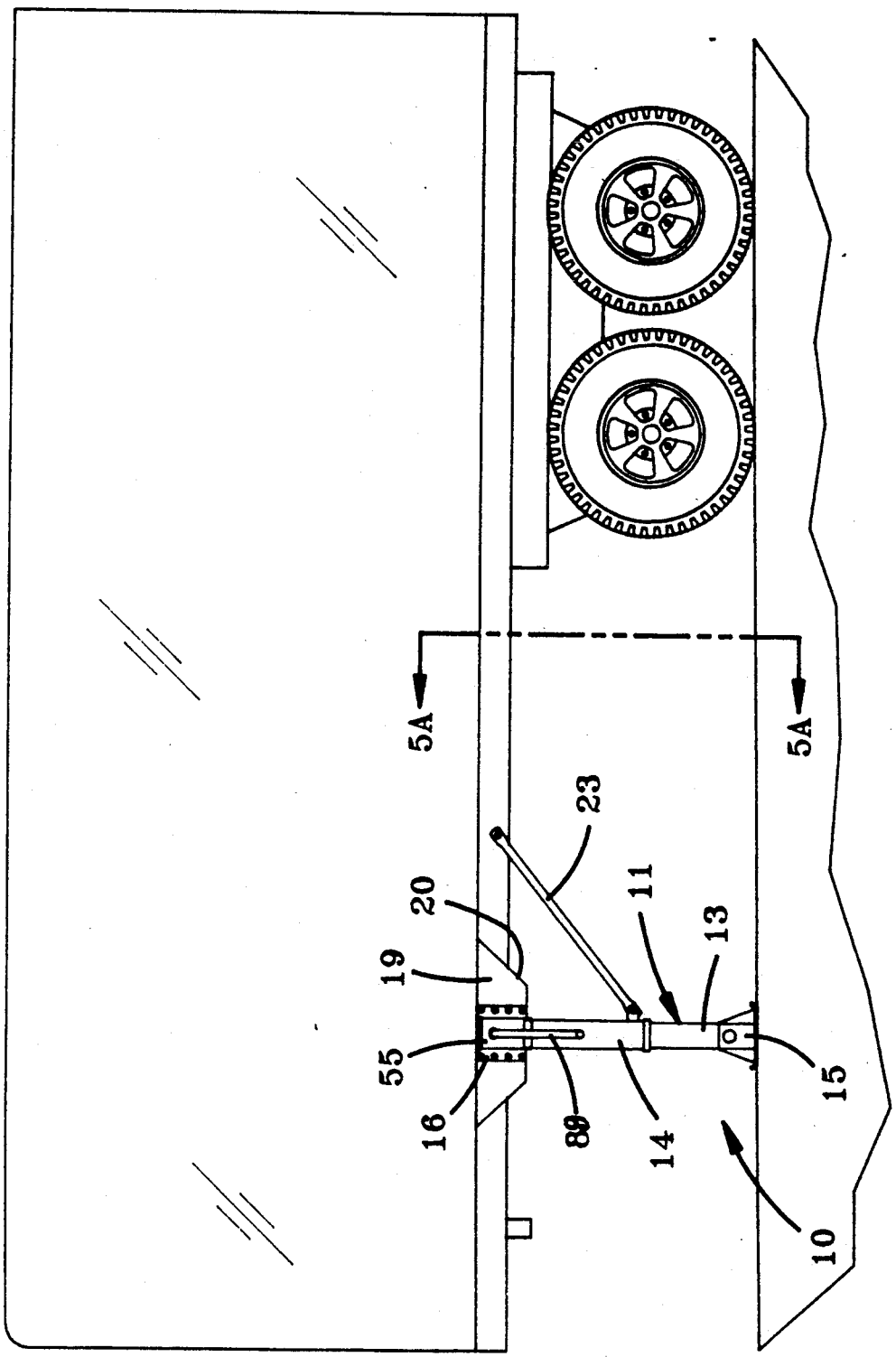
FIG. 5 is a side elevation view of a semitrailer disengaged from its truck tractor, and having the landing gear of FIG. 1 mounted thereon and supporting the front end of the semitrailer.
Figure 5A:
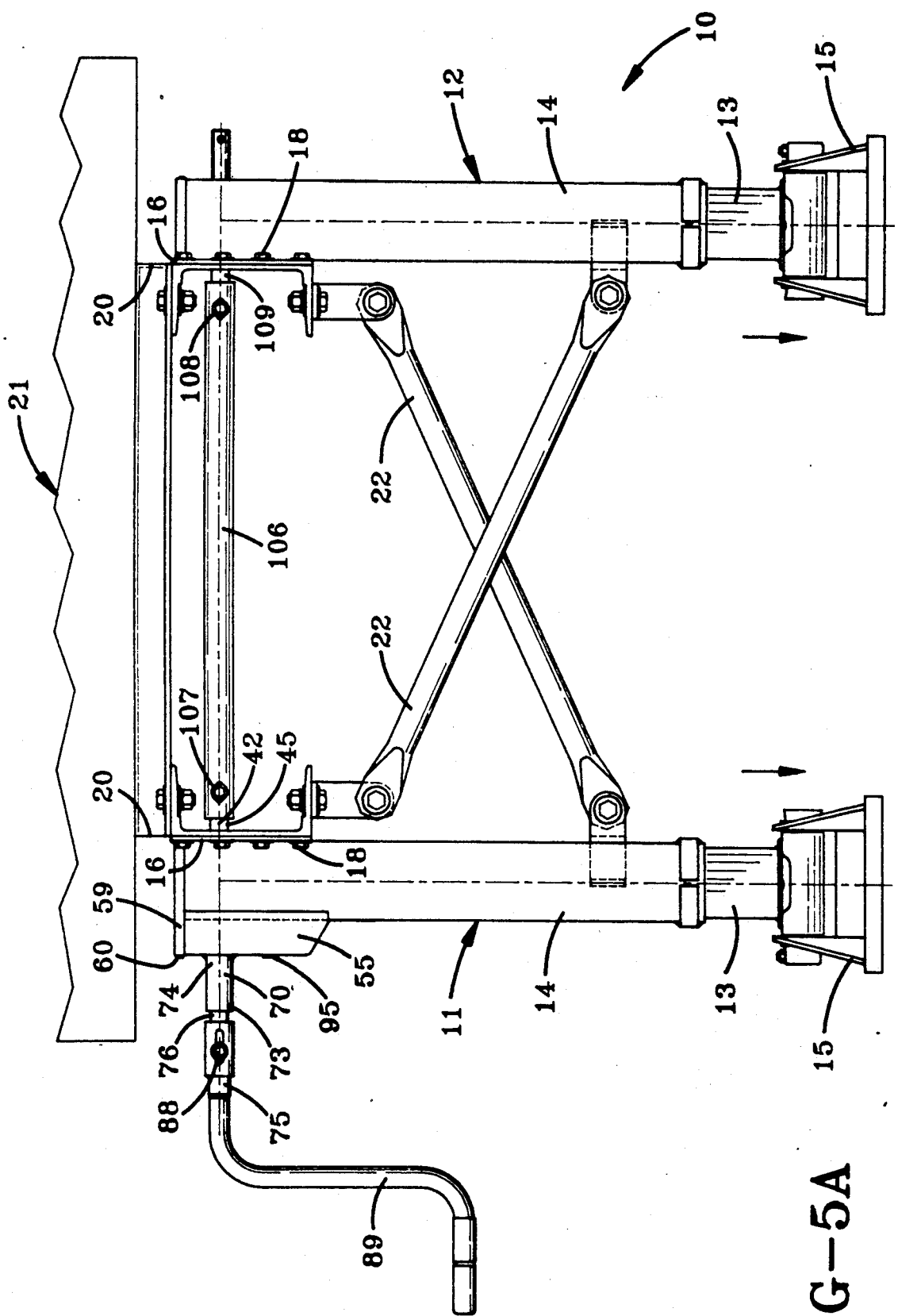
FIG. 5A is a view looking in the direction of arrows 5A of FIG. 5.

A first embodiment of the landing gear for semitrailers of the present invention, is shown in its intended use in FIGS. 5 and 5A and is indicated generally at 10. Landing gear 10 generally includes a pair of upright, spaced, parallel cranking and opposite-side legs 11 and 12, respectively. In the embodiment shown in FIGS. 5 and 5A, cranking leg 11 is disposed on the left or driver's side of the semitrailer and opposite-side leg 12 is positioned on the right or curb-side of the semitrailer. However, it is understood that cranking leg 11 could be placed on the curb-side of the semitrailer and opposite-side leg 12 could be placed on the driver's side without affecting the concept of the present invention. Hereafter, cranking side and opposite-side legs 11 and 12 will be referred to as the left or driver's side and right or curb-side legs, respectively. Each leg 11, 12 includes a lower tube 13 telescopically disposed (FIGS. 2 and 3) within an upper tube 14, in a manner well known to the art and to the literature. A foot 15 is connected to the lower end of lower leg tube 13 in a conventional manner. A flange plate 16 is attached to an upper inboard portion of upper leg tube 14 by any suitable means such as welding (FIG. 1). Each protruding end of flange plate 16 is formed with a plurality of openings 17 for receiving fastening means 18 such as bolts or the like, for attachment of legs 11, 12 to an outboard surface 19 of a frame 20 of a semitrailer 21 (FIGS. 5 and 5A).

A pair of crossing transverse brace bars 22 (FIG. 5A) each is attached at one of its ends to semitrailer frame 20 and at the other of its ends to an opposite leg 11, 12, respectively, for generally stabilizing the legs against side thrust forces and the like. A pair of longitudinal brace bars 23 (FIG. 5) each is attached at one of its ends to upper tube 14 of a respective one of legs 11, 12, and at the other of its ends to semitrailer frame 20.

With regard to the internal components of left or driver's side leg 11, a nut 25 is fixed on the upper end of lower leg tube 13 for threadably receiving a vertical elevating screw shaft 26 (FIGS. 2 and 4) which includes a threaded lower shaft 24 and a reduced diameter, integral unthreaded upper shaft 27. A shoulder 28 is formed at the interface of upper and lower shafts 27 and 24, respectively. An annular collar 29 bears on shoulder 28, and an annular thrust bearing 30 rests on collar 29 about upper shaft 27. A floor base 31 rests on bearing 30 and is disposed about upper shaft 27 which passes through a continuous opening 32 formed in the base. Floor base 31 is welded to the inside surfaces of upper leg tube 14. A hardened thrust washer 33 is disposed on upper shaft 27 and rests on the upper surface of floor base 31. A bevel gear 34 is slidably engaged on upper shaft 27, and is captured thereon in abutment with washer 33 by a beveled pinion gear 40. More specifically, the teeth of laterally oriented cooperative bevel pinion gear 40, which has a smaller diameter than bevel gear 34, mesh with the teeth of horizontally oriented bevel gear 34. Rotary motion is transmitted to upper shaft 27 by a pin 35 which couples bevel gear 34 to the upper shaft in a manner familiar to those of ordinary skill in the art. Hardened thrust washer 33 provides a wear surface for contact by bevel gear 34 and coupling pin 35. Thrust washer 33, bevel gear 34, pin 35, and pinion gear 40 all are contained in an upper compartment 41 of upper leg tube 14 located above floor base 31. Bevel pinion 40 is securely mounted on a laterally oriented output shaft 42 by a pin 43, in a usual manner. Output shaft 42 includes first and second ends 44 and 45 which pass through bushings 46 and 47, respectively, which in turn are fitted in aligned openings 48 and 49 formed in the outboard and inboard walls of upper tube 14 of leg 11. A spacer tube 50 maintains bushings 46, 47 and bevel pinion 40 in their intended positions to prevent lateral movement of output shaft 42.

In accordance with one of the main features of the present invention, a metal gear case 55 and the outboard wall of upper leg tube 14 generally define a gear case compartment 56 into which first end 44 of output shaft 42 extends (FIGS. 1, 2, 3 and 5A). Gear case 55, due to the small number, size and compact orientation of the components contained therein, is formed by a metal bending process as compared to many prior art gear boxes which must be formed by more expensive metal stamping processes due to the larger number, size and/or less compact orientation of the components contained therein. More specifically, the components of the two speed double reduction gear assembly of the landing gear of the present invention contained in gear case 55, all are generally adjacent to the outboard wall of upper leg tube 14, and in particular do not extend beyond the width of the outboard wall. Therefore, gear case 55 formed by mere bending, cooperates with the outboard wall of upper leg tube 14 to adequately cover the components contained therein. In contrast, many prior art landing gear assemblies extend beyond the width of the adjacent upper leg tube, thus requiring, in many cases, a two piece gear case which must be stamped or otherwise machined so that the two pieces fit together properly and adequately protect the components contained therein from outside elements. Gear case 55 is attached to the outboard wall of upper leg tube 14 by a bead weld 57 or the like. A gasket 58 formed of rubber or the like is positioned over the upper open ends of upper leg tube 14 and gear case 55, and is secured thereon and protected by cover 59 which in turn is secured in place by a plurality of screws 60 which threadably engage threaded openings 61 formed in gear case 55. Gasket 58 and cover 59, in cooperation with gear case 55, effectively protect the two speed double reduction gear assembly of landing gear 10 contained within upper compartment 41 of upper leg tube 14 and gear case compartment 56 of leg 11, from outside elements such as dirt, moisture, etc., which could interfere with the efficient operation of the gear assembly.

Figure 2:
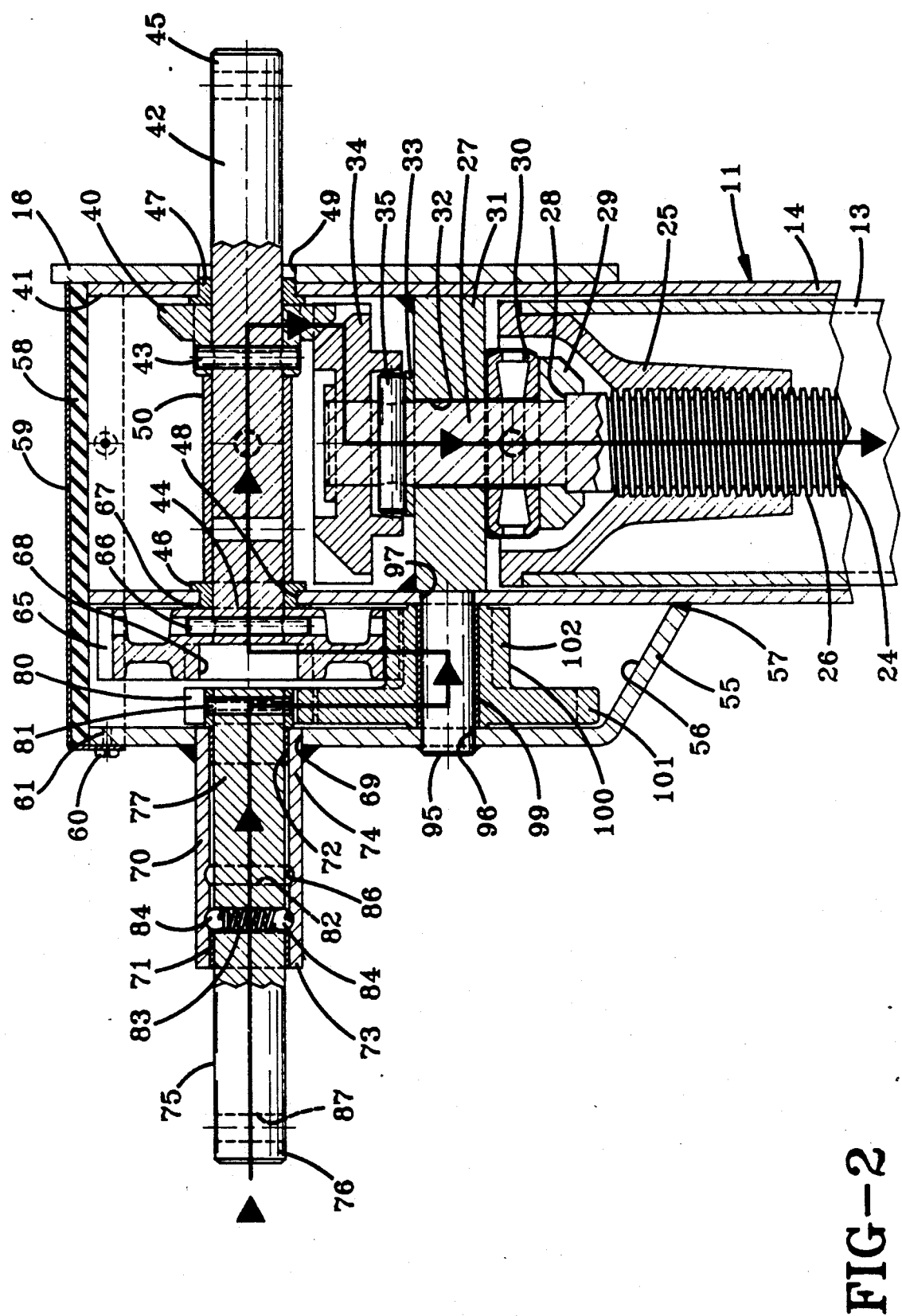
FIG. 2 is a section taken on line 2—2, of FIG. 1, showing the double reduction gear assembly engaged in low gear or the low speed position.
Figure 4:
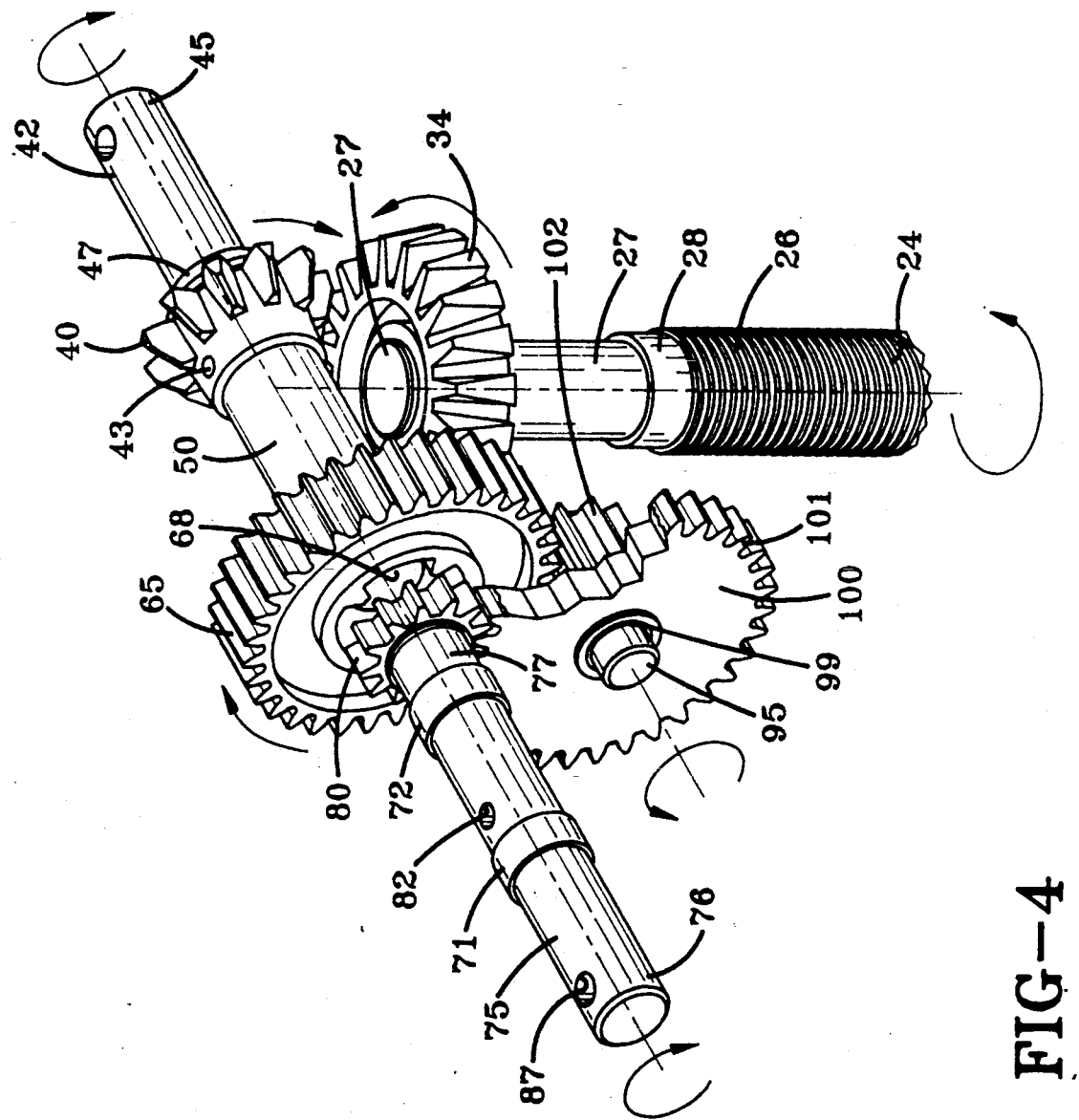
FIG. 4 is a fragmentary perspective view, with portions broken away, of the two speed double reduction gear assembly of the landing gear of the present invention, showing the gears engaged in low gear as in FIG. 2.

In accordance with another of the main features of the present invention, a gear 65 is mounted on first end 44 of output shaft 42 by a pin 66 in a usual manner, and is spaced from the outboard wall of upper leg tube 14 by a washer 67 (FIGS. 2, 3 and 4). Spacer tube 50, by maintaining bushings 46, 47 and bevel pinion 40 in their intended positions and preventing lateral movement of output shaft 42, further maintains gear 65 in its proper lateral orientation in gear case compartment 56. The outboard central portion of gear 65 is formed with a spline slot 68. An opening 69 formed in gear case 55 is generally aligned with spline slot 68, and the second end of a sleeve 70 having first and second ends 73 and 74, respectively, is disposed therein and welded to the gear case. A pair of bushings 71 and 72 are fitted in first and second ends 73 and 74, respectively, of sleeve 70 and is in-line with output shaft 42. An input shaft 75 having first and second ends 76 and 77, respectively, is slidably mounted in bushings 71, 72 of sleeve 70 and is in-line with output shaft 42. Second end 77 of input shaft 75 has a pinion gear or spline 80 secured thereon by a pin 81 in a usual manner. A transverse continuous cylindrical opening 82 is formed in a central portion of input shaft 75. A detent spring 83 having a detent ball 84 disposed on each of its ends is fitted within opening 82 for positively engaging first and second annular recesses 85 and 86, respectively, formed in the interior surface of first end 73 of sleeve 70. A transverse continuous cylindrical opening 87 is formed in first end 76 of input shaft 75, for receiving a bolt 88 (FIG. 1) or other means for fastening a crank handle 89 to input shaft 75. A fixed shaft 95 is mounted in gear case compartment 56 below gear 65 and pinion gear 80. More specifically, shaft 95 extends between and is fitted in aligned openings 96 and 97 formed in gear case 55 and the outboard wall of upper leg tube 14, respectively. Shaft 95 is maintained in a non-rotational fixed position by welding to gear case 55. A bushing 99 is disposed on shaft 95, and an intermediate gear 100 containing two sets of gear teeth 101 and 102 for meshing with pinion gear 80 and gear 65, respectively, is rotatably mounted on bushing 99.

Figure 6:
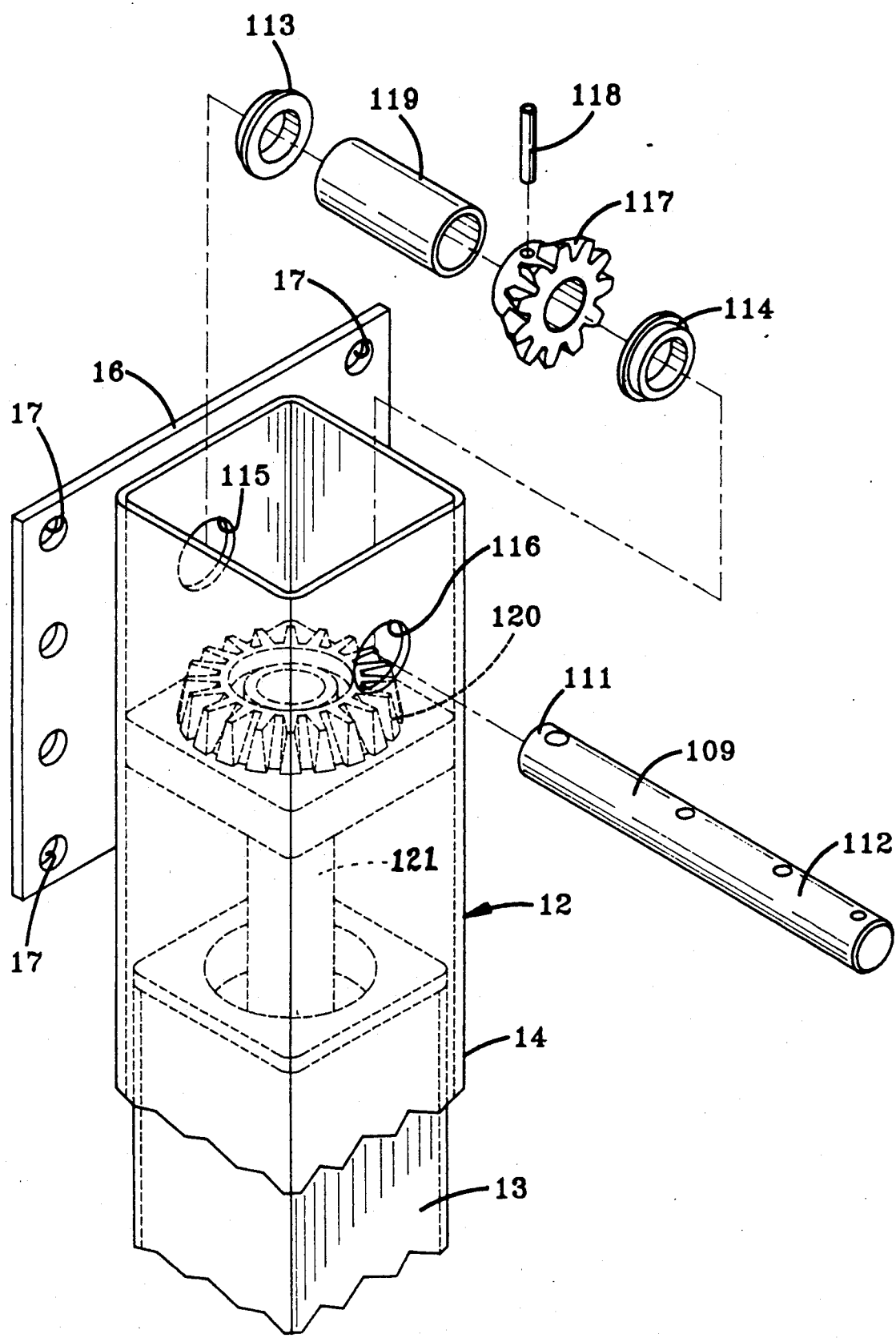
FIG. 6 is an exploded fragmentary perspective view, with hidden parts shown by dashed lines, of the gear assembly of the opposite-side leg of the landing gear of the present invention, shown adapted for mounting on an outboard position on a semitrailer frame.
Figure 6A:
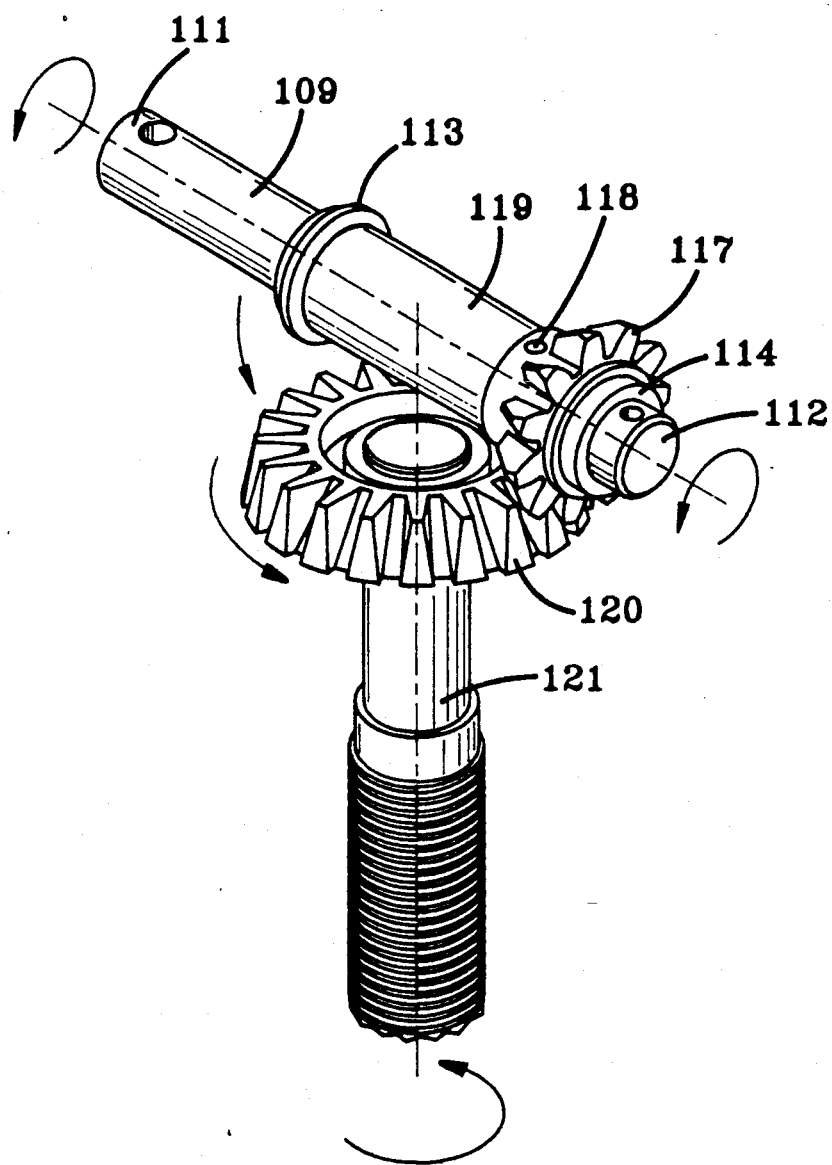
FIG. 6A is a fragmentary perspective view of the gear assembly of the opposite-side leg of FIG. 6, showing the manner in which the gears mesh.

As shown in FIG. 5A, a connecting shaft 106 extends between and is secured at each of its ends by fasteners 107 and 108 such as bolts and the like, to second end 45 of output shaft 42 of leg 11 and to an input shaft 109 of leg 12, respectively. The internal components contained in the right or curb-side leg 12 of landing gear 10 are similar to those contained in the lower and upper leg tubes 13, 14 of left or driver's side leg 11, and are illustrated in FIGS. 6 and 6A. Briefly, input shaft 109 includes first and second ends 111 and 112, respectively, which are rotatably mounted in bushings 113 and 114, which in turn are fitted in aligned openings 115 and 116 formed in the inboard and outboard walls of upper leg tube 14. A bevel pinion 117 is securely mounted on second end 112 of output shaft 109 by a pin 118 in a usual manner. A spacer tube 119 maintains bushings 113, 114 and bevel gear 117 in their intended positions to prevent lateral movement of input shaft 109. Bevel pinion 117 meshes with a bevel gear 120 which in turn is disposed on an elevating screw shaft 121 in a manner similar to bevel gear 34 of driver's side leg The structure and manner of mounting screw shaft 121 in curbside leg 12 is similar to that described above for the mounting of screw shaft 26 in driver's side leg and such description is hereby fully incorporated by reference.

Figure 5B:
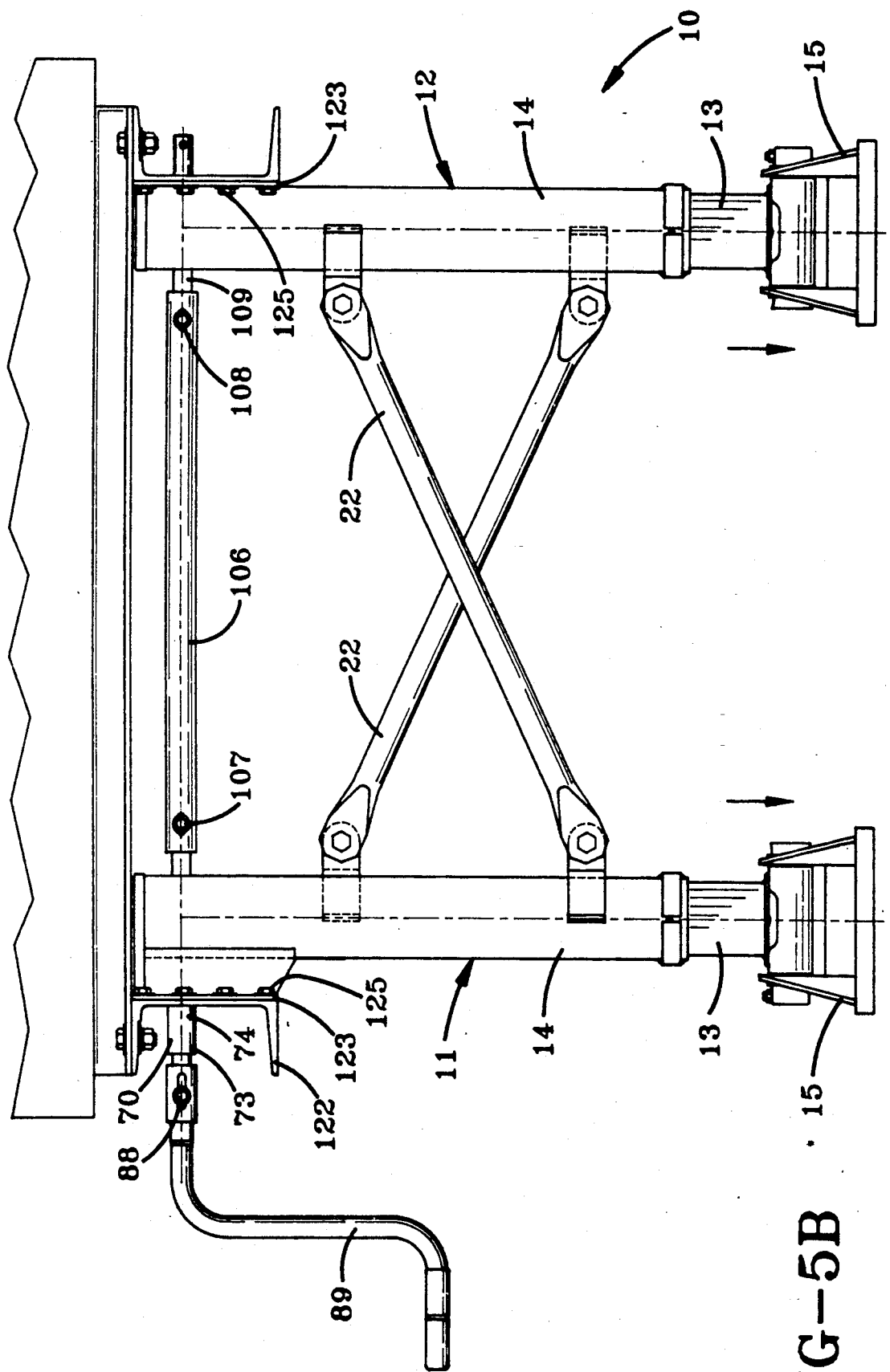
FIG. 5B is a view similar to FIG. 5A, showing the landing gear of FIG. 1A mounted on an inboard position on the semitrailer frame.

If it is desired to mount legs 11 and 12 on an inboard surface of a semitrailer frame 122 (FIG. 5B), a flange plate 123 is attached to an outboard surface of gear case 55 by any suitable means such as welding (FIG. 1A), and preferably also functions as a part of the gear case. Each protruding end of flange plate 123 is formed with a plurality of openings 124 for receiving fastening means 125 such as bolts or the like, for attachment of legs 11, 12 to semitrailer frame 122. If desired, legs 11 and 12 can each have both flange plates 16 and 123 attached thereto (see Fig. IB), so that legs 11, 12 of landing gear 10 may be attached either to the outboard or inboard surfaces of a semitrailer frame.

Landing gear 10 of the present invention is operated in the following manner when it is desired to work the landing gear in low gear or low speed, wherein the ratio of turns of crank handle 89 to vertical distance of travel of legs 11, 12 is high, but wherein the mechanical advantage enjoyed by the operator of the landing gear also is high. More particularly, this ratio is from about 15 to about 50, desirably from about 20 to about 40, and preferably from about 25 to about 35 turns per inch, which generally are standard ratios. Landing gear 10 is shown in the low gear in FIGS. 2 and 4. To lower upper leg tube 14 with respect to lower leg tube 13 of the driver's side and curb side legs 11 and 12, respectively, in low speed, input shaft 75 is manually slidably moved to its outwardmost position by applying a pulling force to crank handle 89, so that detent balls 84 are positively engaged with first annular recess 85. Crank handle 89 and attached input shaft 75 then are manually rotated in a clockwise direction as shown by the arrow in FIG. 4, whereby pinion gear 80 meshes with first teeth 101 of intermediate gear 100 for rotating the intermediate gear in a counterclockwise direction. In transmitting the rotary motion of input shaft 75 from pinion gear 80 to first teeth 101 of intermediate gear 100, a first reduction having a magnitude of about 2.75 is achieved. As is well known to those of ordinary skill in the art, in practical terms, such a reduction means that intermediate gear 100 is rotating about 2.75 times slower than input shaft 75, but a gain in mechanical advantage of a magnitude of about 2.75 is at the same time realized by the operator of landing gear 10. That is, due to the reduction achieved in transmitting rotary motion from pinion gear 80 to first teeth 101 of intermediate gear 100, the operator will find that crank handle 89 is about 2.75 times easier to turn than without such a reduction.

Second gear teeth 102 of intermediate gear 100, which also are rotating in a counterclockwise direction with integral first teeth 101, mesh with gear 65 thereby rotating it in a clockwise direction which in turn rotates output shaft 42 in a clockwise direction. The transmission of rotary motion from second teeth 102 of intermediate gear 100 to gear 65 results in a second reduction also having a magnitude of about 2.75, with reduction having the meaning as defined immediately above. Thus, the total reduction obtained is the product of the first and second reductions, or $2.75 \times 2.75 = 7.56$. Thus, in practical terms, although gear 65 and attached output shaft 42 turn about 7.56 times slower than input shaft 75, the operator enjoys an increase in mechanical advantage by a factor of about 7.56. Clockwise-rotating bevel pinion 40 meshes with bevel gear 34 to rotate the bevel gear and attached screw shaft 26 in a counterclockwise direction.

A third reduction having a magnitude of about 2.0 occurs in going from bevel pinion 40 to bevel gear 34, resulting in an overall reduction of $2.0 \times 7.56$ equalling about 15, meaning that screw shaft 26 turns about 15 times slower than input shaft 75 in low gear. However, landing gear 10 of the present invention would be customarily referred to in the art and literature as a double reduction assembly based on the two reductions which take place within gear case 55. Most prior art landing gear have a single or double reduction which takes place in the gear case, as well as another reduction which takes place at the junction of the output shaft and the elevating screw shaft. However, such landing gear are identified as single reduction or double reduction based on the number of reductions which take place in the gear case compartment alone. Therefore, the total reduction of about 15, when combined with the screw lead pitch of about 2.25 of threaded lower shaft 24 of elevating screw shaft 26, results in a low gear ratio of crank handle turns to vertical travel distance of $2.25 \times 15$ equalling about 34 turns per inch. This means that, in low gear, for every 34 turns of crank handle 89, screw shaft 26 will travel one inch in vertical distance. Although screw shaft 26 is turning about 15 times slower than input shaft 75, the operator enjoys a mechanical advantage of a magnitude of about 15, that is, crank handle 89 turns about 15 times easier than it would without such a reduction. Rotation of screw shaft 26 in nut 25 in the counterclockwise direction causes downward movement of the screw shaft in the nut resulting in retraction of lower leg tube 13 within upper leg tube 14.

Output shaft 42 simultaneously rotates connecting shaft 106 in a clockwise direction, which in turn rotates input shaft 109 of leg 12 in a clockwise direction as shown in FIG. 6A. Attached clockwise-rotating bevel pinion 117 meshes with bevel gear 120 to rotate the bevel gear and attached screw shaft 121 in a counterclockwise direction in a manner similar to the rotation of screw shaft 26 of driver's side leg 11, for retracting lower tube 13 in upper leg tube 14. Of course, it is understood that rotation of crank handle 89 in the opposite or counterclockwise direction results in opposite movement of all of the above-described components of landing gear 10, which in turn results in extension of lower leg tube 13 from upper leg tube 14 in both legs 11, 12.

Figure 2A:
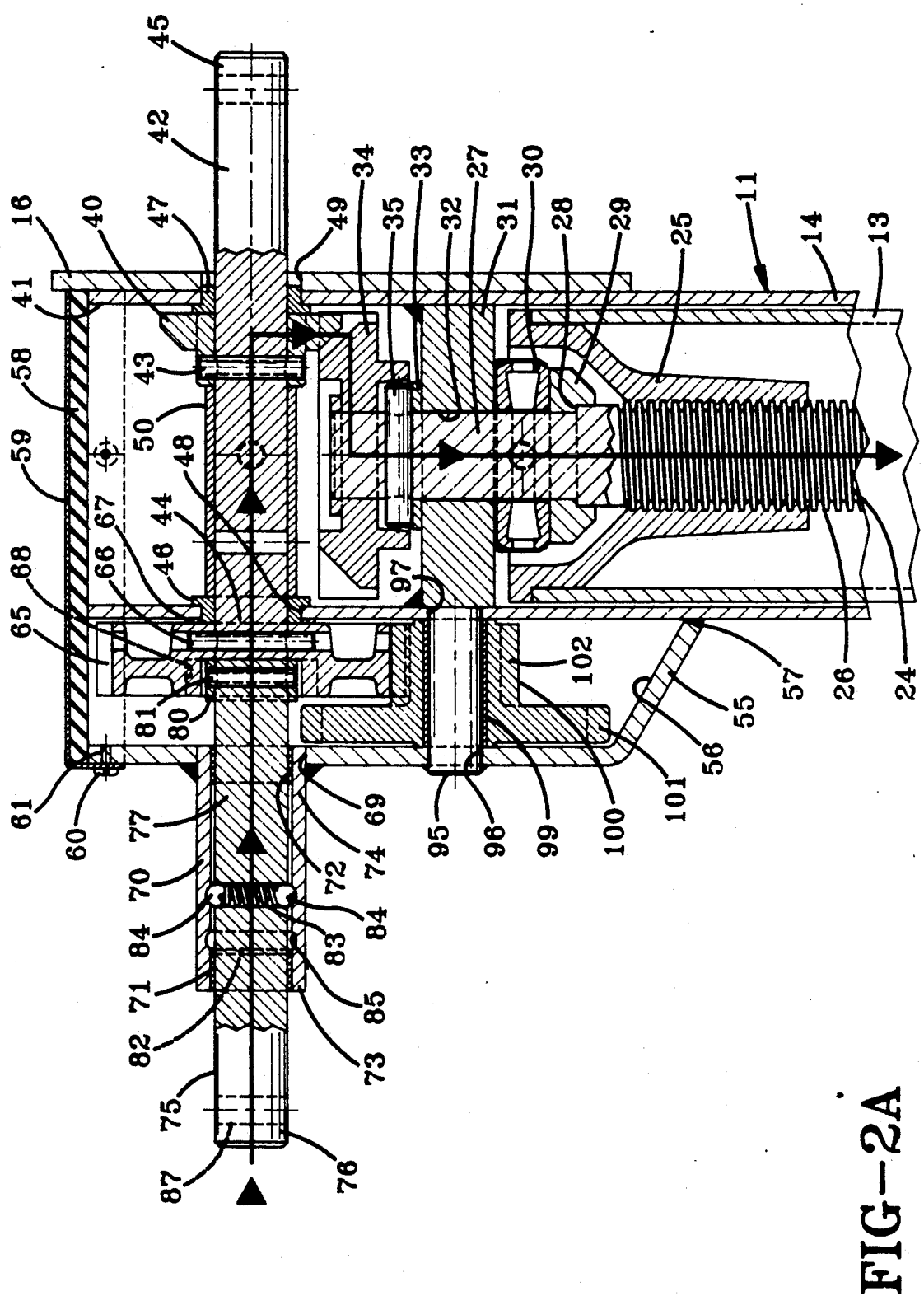
FIG. 2A is a view similar to FIG. 2, showing the gear assembly shifted inwardly and engaged in high gear or the high speed position.

In accordance with another of the main features of the present invention, when it is desired to work landing gear 10 in high gear or high-speed, wherein the ratio of turns of crank handle 89 to vertical distance of travel of legs 11, 12 is low, but wherein the mechanical advantage realized by the operator also is low, the landing gear is operated in the following manner. Such ratio is from about 2 to about 5, desirably from about 3 to about 4.5, and preferably from about 4 to about 4.5 turns per inch, which generally are standard ratios. Landing gear 10 is shown in high gear in FIGS. 2A and 4A. To lower upper leg tube 14 with respect to lower leg tube 13 of the driver's side and curb-side legs 11 and 12, respectively, in high speed, input shaft 75 is manually slidably moved to its inwardmost position by applying a pushing force to crank handle 89, so that detent balls 84 disengage from first annular recess 85 and positively engage second annular recess 86. Such inward movement of input shaft 75 from the outermost position shown in FIGS. 2 and 4 to the innermost position shown in FIGS. 2A and 4A causes pinion gear 80 to slidably engage spline slot 68 of gear 65. It is important to note that the relatively small size of pinion gear 80, which must be moved through heavy lubricating grease contained in gear case compartment 56 during shifting between gears, results in an apparatus with improved shifting ease. More particularly, this grease offers resistance to the movement of pinion gear 80 therethrough, and makes such movement particularly difficult in cold weather conditions when the grease is more viscous. However, the small size of pinion gear 80 relative to many prior art gears which must be shifted through such lubricating grease, substantially reduces the effect of the grease resistance. Moreover, the relatively short horizontal distance between first and second annular recesses 85 and 86 of about ⅜ inch, which is less than many prior art devices which require an inward movement of a gear of about 1¼ inch to accomplish a similar shift from one gear speed to another gear speed, also aids in improving the shifting ease of the apparatus of the present invention. Thus, such a spline shifting or "clutch shifting" apparatus is more efficient than many known prior art landing gear shifting apparatus, including "constant gear mesh" designs.

Figure 4A:
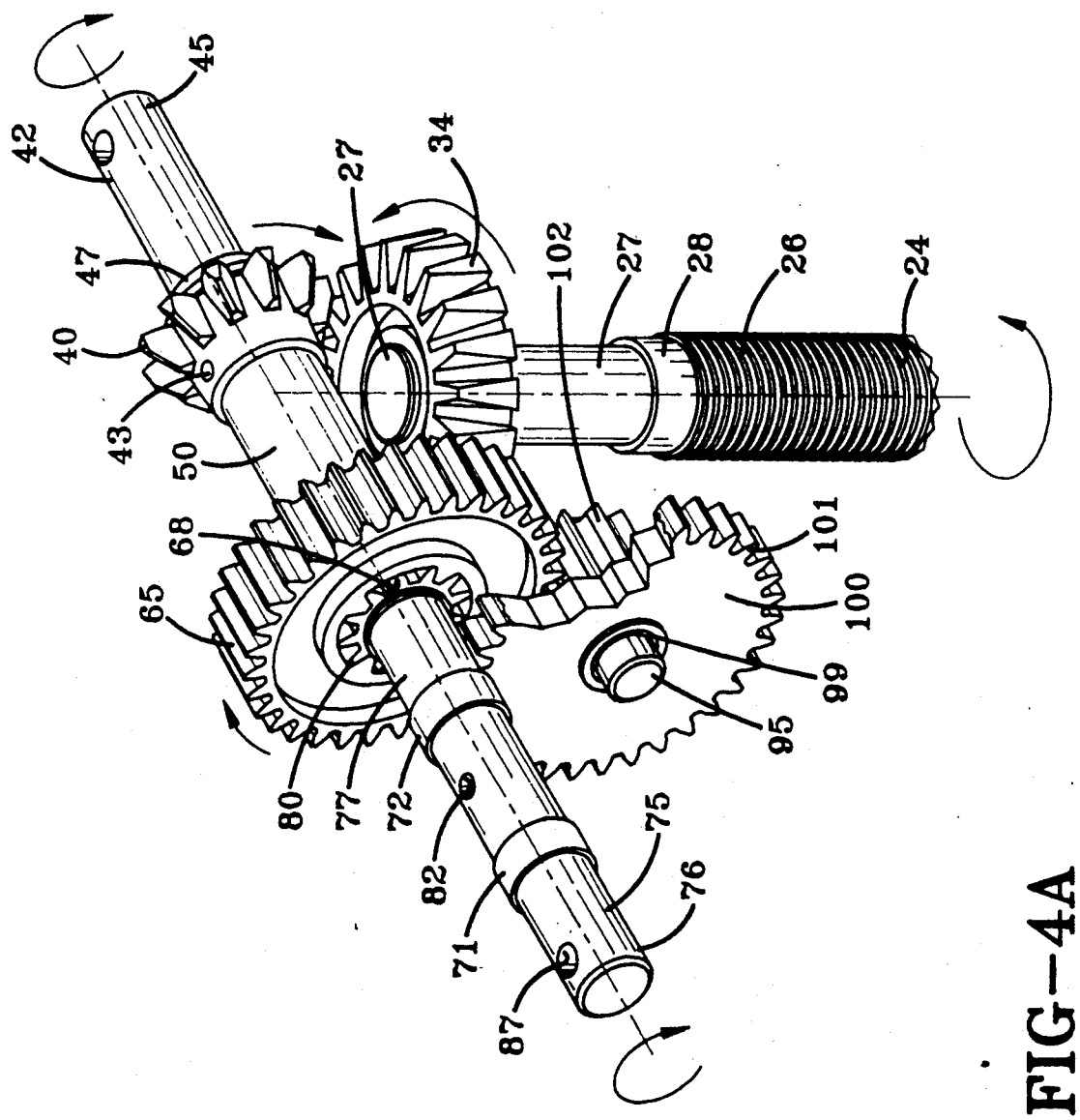
FIG. 4A is a view similar to FIG. 4, showing the gear assembly engaged in high gear as in FIG. 2A.

Crank handle 89 then is manually rotated in a clockwise direction as shown in FIG. 4A whereby clockwise rotating input shaft 75 rotates attached pinion gear 80 in a clockwise direction, which in turn rotates engaged gear 65 and attached output shaft 42 in a clockwise direction. Attached bevel pinion 40 rotates in a clockwise direction and meshes with bevel gear 34 to rotate the bevel gear and attached screw shaft in a counterclockwise direction. As discussed above, the reduction in going from bevel pinion 40 to bevel gear 34 is of a magnitude of about 2.0, which is the only reduction which occurs in high gear, and when combined with the screw lead pitch of about 2.25 of threaded lower shaft 24 of elevating screw shaft 26, results in a high gear ratio of crank handle turns to vertical travel distance of 2.25×2.0 equalling about 4.5 turns per inch. More specifically, this means that in the high gear, for every 4.5 turns of crank handle 89, screw shaft 26 travels about one inch in a vertical direction, or faster than in low gear. However, it should be noted that when landing gear 10 is in high gear or high-speed, the operator conversely only enjoys a mechanical advantage of a magnitude of about 2.0 with screw shaft 26 turning only about 2 times slower than input shaft 75, as compared to a mechanical advantage of about 15 in low gear. Rotation of screw shaft 26 in nut 25 in the counterclockwise direction causes downward movement of the screw shaft in the nut resulting in retraction of lower leg tube 13 in upper leg tube 14. Operatively connected curb-side leg 12 simultaneously operates in a similar manner as described above for the description of the operation of landing gear 10 in low speed. Of course, it is understood that rotation of crank handle 89 in the opposite or counterclockwise direction results in opposite movement of all of the above-described components of landing gear 10, which in turn results in extension of lower leg tube 13 from upper leg tube 14 in both legs 11, 12.

It should be noted and is understood that depending on whether screw shaft 26 and nut 25 are threaded in a right-hand or a left-hand direction, rotation of crank handle 89 in a given direction will cause lower leg tube 13 either to retract within or extend from upper leg tube 14.

Figure 8:
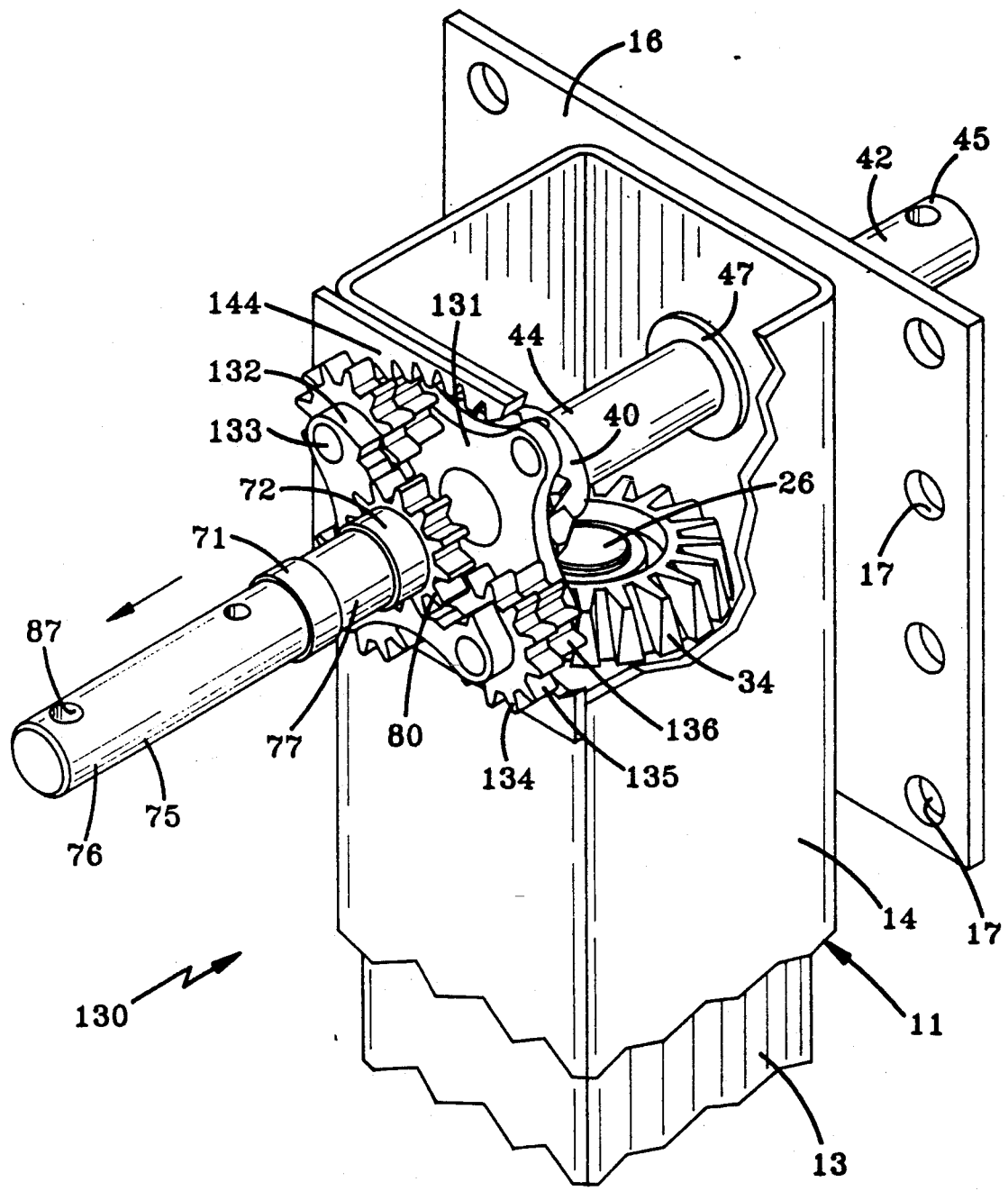
FIG. 8 is a fragmentary perspective view, with portions broken away, of the gear assembly of FIG. 7, showing the gears engaged in high gear or the high speed position.
Figure 9:
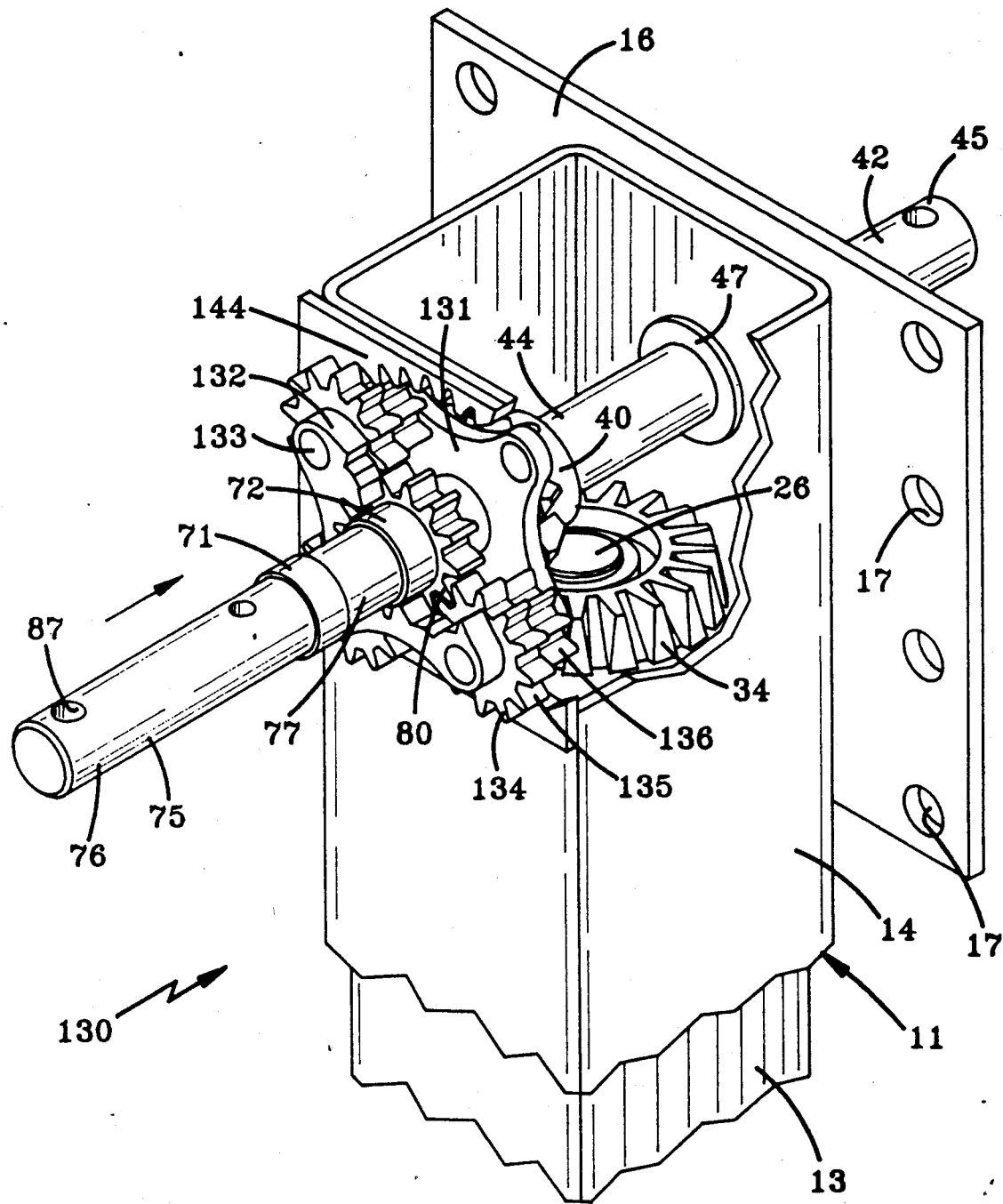
FIG. 9 is a view similar to FIG. 8 showing the gear assembly shifted inwardly and engaged in low gear or the low speed position.

A second embodiment of the landing gear for semi-trailers of the present invention is indicated generally at 130 and is shown in FIGS. 7 through 9. Second embodiment 130 is similar to first embodiment 10 in many respects, excepting the structure, arrangement and operation of the gears used to achieve the double reduction mechanical advantage, and in particular the structure, arrangement and operation of gears disposed on and about output shaft 42. The structure, arrangement and operation of the other components of landing gear 130 are similar to those described above for landing gear 10, which description is hereby fully incorporated by reference with regard to landing gear 130.

Specifically, an output stub 131 is welded to the outboard face of bevel pinion 40, which in turn is secured on first end 44 of output shaft 42 by pin 43 in a usual manner. Second end 45 of output shaft 42 passes through bushing 47 which in turn is fitted in opening 49 formed in the inboard wall of upper tube 14 of leg 11. An increased-diameter opening 141 is formed in the outboard wall of upper leg tube 14 and is generally aligned with opening 49 of the inboard wall. A plate 138 formed with an opening 142 of similar diameter to opening 141 is welded to the outboard wall of upper leg tube 14, so that openings 141 and 142 are generally aligned. The circumference of openings 141 and 142 are formed with first and second sets 143 and 144 of cooperative internal gear teeth, respectively. An input carrier 132 formed with a spline slot 140 is disposed in gear case compartment 56, and is secured to output stub 131 in a spaced relationship by a plurality of dowel pins 133 which extend between and are attached to the output stub and the input carrier. A planet pinion 134 having a first set of gear teeth 135 and a second reduced diameter set of gear teeth 136 is rotatably disposed on each dowel pin 133 for free rotation thereon between output stub 131 and input carrier 132.

The second embodiment 130 of the landing gear for semitrailers of the present invention is operated in the following manner. It is understood that although the structure, arrangement and operation of the double reduction gear assembly of second embodiment landing gear 130 is different than that of first embodiment landing gear 10, the concept of the invention is the same for both embodiments, including the ratios of turns of crank handle 89 to vertical distance of travel of legs 12 and magnitudes of mechanical advantage achieved described above for landing gear 10, which ratio and magnitude values are fully incorporated by reference herein for the description of landing gear 130. When it is desired to operate landing gear 130 in high gear or high speed, input shaft 75 is manually slidably moved to its outermost position by applying a pulling force to crank handle 89, so that detent balls 84 are positively engaged with first annular recess 85. Such outward movement of input shaft 75 causes pinion gear 80 to slidably engage spline slot 140 of input carrier 132 (FIG. 8). Crank handle 89 and attached input shaft 75 then are manually rotated in the desired direction for raising or lowering upper leg tube 14 with respect to lower leg tube 13 of the driver's side and curb-side legs 11 and 12, respectively. Rotation of crank handle 89 and attached input shaft 75 in the desired direction for retraction or extension of lower leg tube 13 with respect to upper leg tube 14, in turn causes rotation of attached pinion gear 80 and engaged input carrier 132. Input carrier 132 in turn rotates output stub 131 and attached bevel pinion 40 which meshes with bevel gear 34, and second set of gear teeth 136 of planet pinions 134 mesh with internal gear teeth 143, 144 to generally stabilize the rotating assembly. The structure, arrangement and operation of the remaining components of landing gear 130 is similar to that described above for landing gear 10, which description has been fully incorporated by reference.

When it is desired to shift to low gear or low speed, a pushing force is applied to crank handle 89 for manually slidably moving input shaft 75 to its inward most position, wherein detent balls 84 disengage from first annular recess 85 and positively engage second annular recess 86. As a result of such inward movement of input shaft 75, pinion gear 80 disengages from spline slot 140 of input carrier 132, and meshes with first set of gear teeth 135 of planet pinions 134 (FIG. 9), whereby a first reduction occurs in transmitting rotary motion from pinion gear 80 to first gear teeth 135 of planet pinions 134. Second gear teeth 136 of planet pinions 134 mesh with internal gears 143, 144 of upper leg tube 14 and attached plate 138, respectively, for achieving a second reduction. The epicyclic rotation of planet pinions 134 within internal gears 143, 144 causes corresponding rotation of outward stub 131 and attached bevel pinion 40, which in turn meshes with bevel gear 34. Again, the structure, arrangement and operation of the remaining components of landing gear 130 is similar to that described above for landing gear 10, which description has been fully incorporated by reference.

Figure 10:
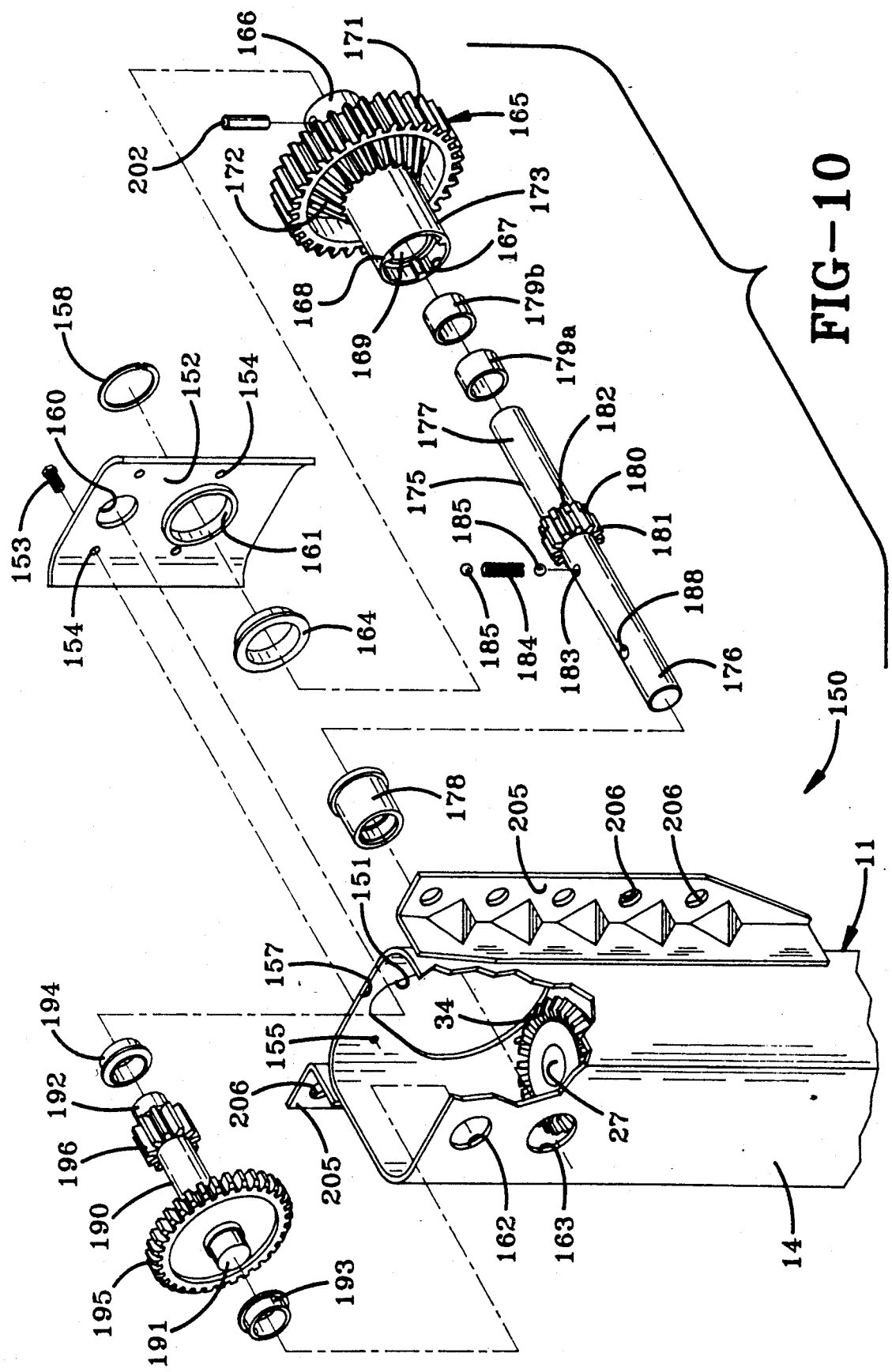
FIG. 10 is an exploded fragmentary perspective view, with portions broken away, of a third embodiment of the two speed double reduction gear assembly of the cranking leg of the landing gear of the present invention, shown adapted for mounting on an outboard position on a semitrailer frame.
Figure 11:
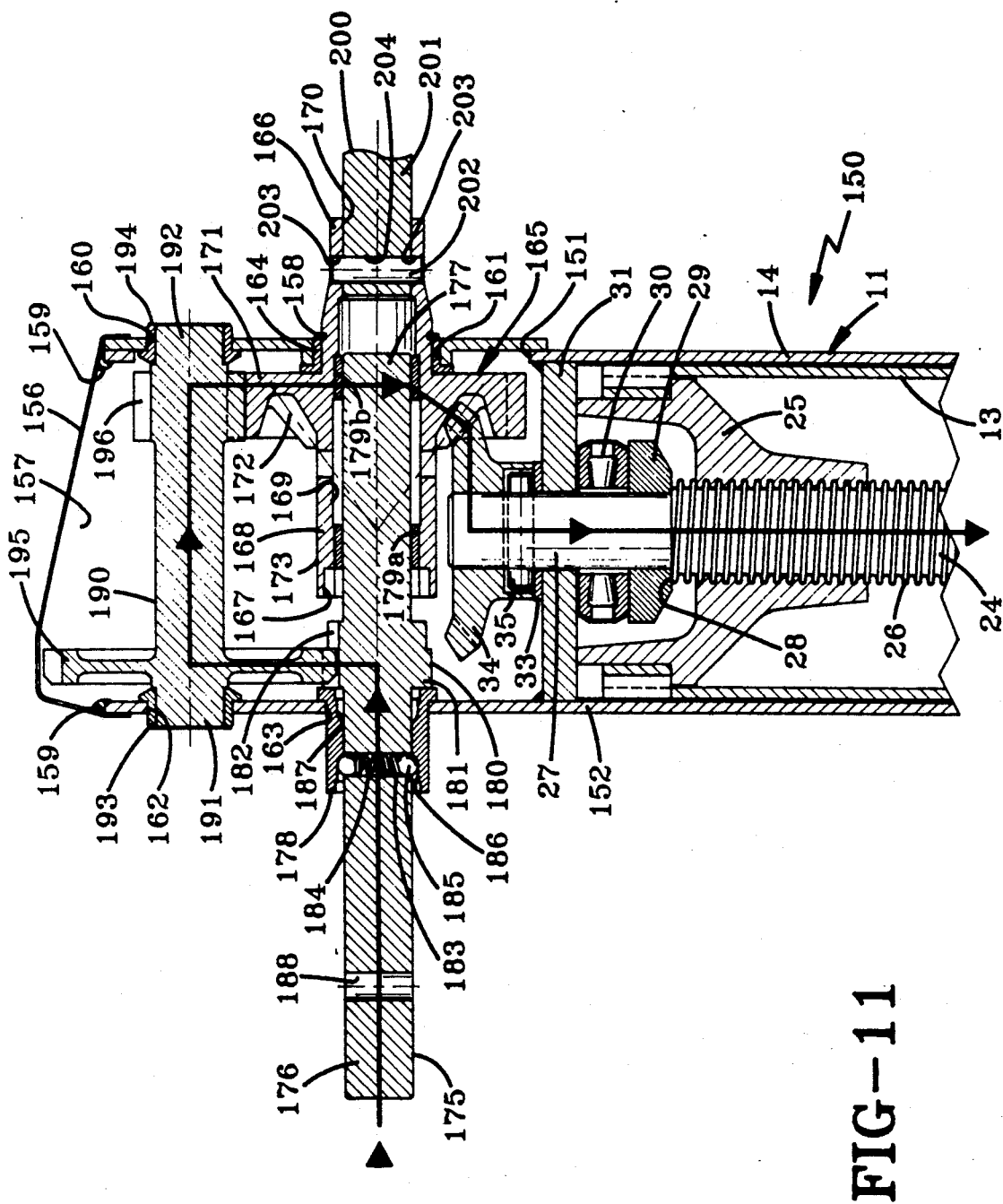
FIG. 11 is a longitudinal sectional view of the two speed gear assembly of FIG. 10, showing the gears engaged in low gear or the low speed position.
Figure 11A:
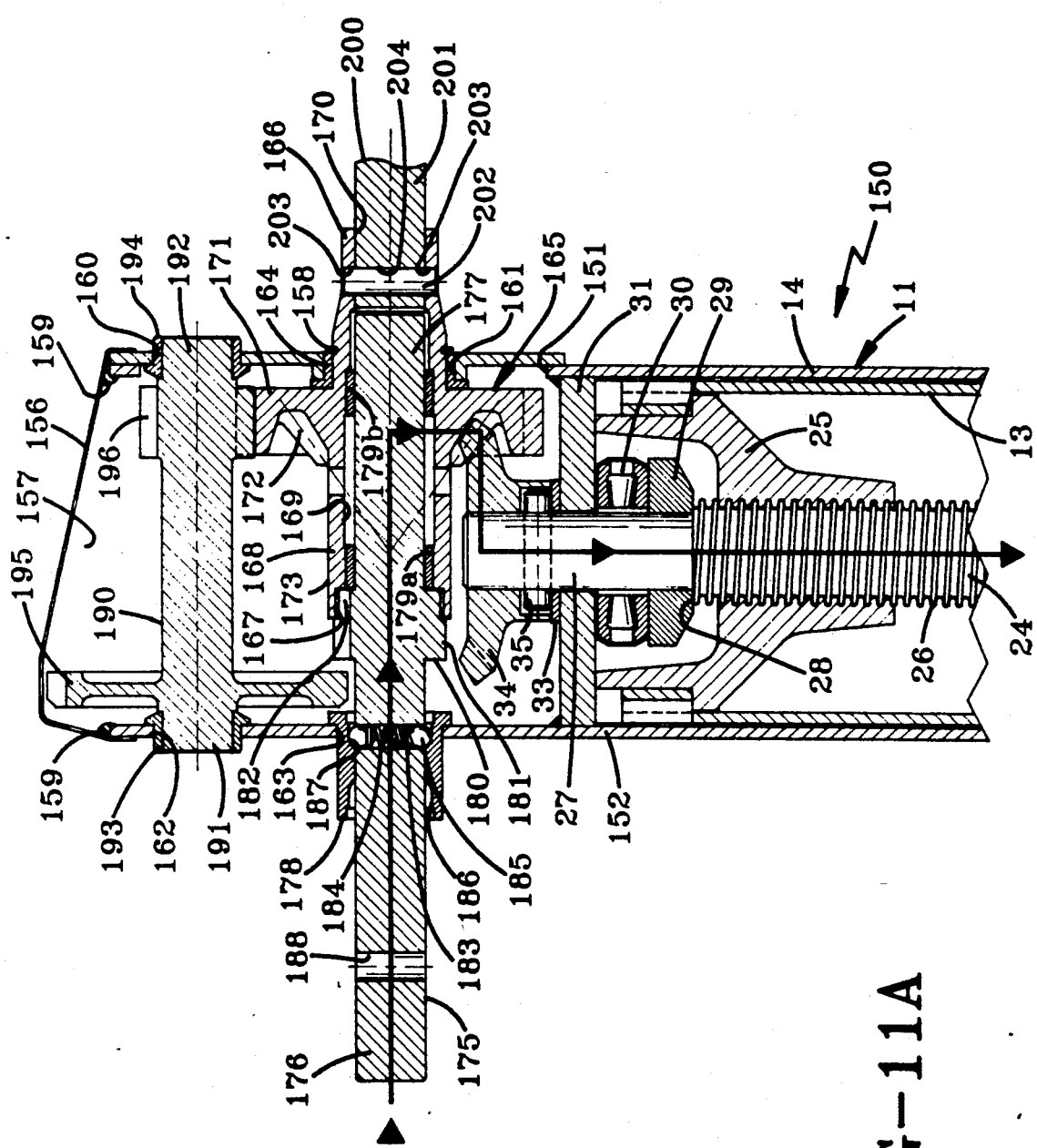
FIG. 11A is a view similar to FIG. 11, showing the gear assembly shifted inwardly and engaged in high gear or the high speed position.

A third embodiment of the landing gear for semitrailers of the present invention is indicated generally at 150 and is shown in FIGS. 10, 11 and 11A. Third embodiment 150 is similar to first embodiment 10 in many respects, excepting the structure, arrangement and operation of the gear assembly used to achieve the double reduction mechanical advantage. The structure, arrangement and operation of the other components of landing gear 150 are similar to those described above for landing gear 10, which description is hereby fully incorporated by reference With regard to landing gear 150.

More particularly, in accordance with one of the main features of third embodiment 150 of the present invention, left or driver's side leg 11 is free of a separate gear case, and instead all of the components of the double reduction gear assembly of third embodiment landing gear 150 are contained generally entirely within upper leg tube 14 (FIG. 11). A large access opening 151 is formed in the upper end of the inboard wall of upper leg tube 14. A cover 152 is removably mounted over access opening 151 by a plurality of self-tapping screws 153, which each pass through and threadably engage a respective one of a plurality of pairs of aligned openings 154 and 155 formed in cover 152 and the upper inboard wall of upper leg tube 14, respectively. Access opening 151 facilitates the assembly and repair, if necessary, of the double reduction gear assembly of third embodiment 150, together with cover 152 which acts as a locator for parts of the gear assembly, maintains proper gear spacing and the like, as will become apparent from the description which follows. A bent metal cap 156 covers the open upper end of upper leg tube 14, and is secured thereon by any suitable means such as self-tapping screws (not shown). Cap 156, together with floor base 31 and the walls of upper leg tube 14, define an upper compartment 157 of upper leg tube 14 which contains all of the elements of the two speed double reduction gear assembly of third embodiment 150. A gasket 159 of any suitable type such as one formed of an elastomeric material is placed or applied at the interface of cap 156 and upper leg tube 14 in a usual manner. Compartment cap 156 and gasket 159 effectively protect the two speed double reduction gear assembly contained within upper compartment 157 from outside elements such as dirt, moisture, etc., which could interfere with the efficient operation of the assembly. It should especially be noted that containment of all of the components of the double reduction gear assembly within upper leg tube 14 eliminates the need for a separate gear box attached to the upper leg tube as in many prior art landing gear assemblies.

A pair of vertically spaced upper and lower openings 160 and 161 are formed in cover 152, and are aligned with a pair of vertically spaced upper and lower openings 162 and 163, respectively, formed in the outboard wall of upper leg tube 14. A bushing 164 is frictionally fitted in lower opening 161 of cover 152. A cluster gear 165 includes an elongated shaft 173 formed with a spline slot 167 in an outboard end 168 thereof, which communicates with a reduced diameter, longitudinal continuous cylindrical opening 169, which in turn communicates with and terminates in a further reduced diameter longitudinal continuous cylindrical opening 170 formed in an inboard end 166 of elongated shaft 173. Inboard end 166 of elongated shaft 173 extends through bushing 164 and out of upper compartment 157. A snap ring 158 is disposed about inboard end 166 of elongated shaft 173 and abuts the inboard surface of cover 152 to generally assist in preventing horizontal movement of cluster gear 165 in an outboard direction. An output shaft 200 includes a first end 201 and a second end (not shown), wherein first end is operatively connected to elongated shaft 173 of cluster gear 165 of leg 11, and the second end is operatively connected to a connecting shaft (also not shown) which in turn is operatively connected to the input shaft of the curb side leg (both not shown). More specifically, a pin 202 is frictionally fitted in a pair of opposed openings 203 formed in inboard end 166 of elongated shaft 173, and in an aligned transverse continuous cylindrical opening 204 formed in first end 201 of output shaft 200.

In accordance with another of the important features of third embodiment 150 of the present invention, cluster gear 165 further includes a gear 171 formed integrally on the central portion of elongated shaft 173, and a bevel pinion 172 also is formed integrally with elongated shaft 173 and is recessed within gear 171. This recessing of bevel pinion 172 in gear 171 results in a substantial compacting of the gear assembly which contributes to enabling the gear assembly to be generally entirely contained within upper compartment 157 of upper leg tube 14.

In accordance with still another important feature of the present invention, an input shaft 175 having outboard and inboard ends 176 and 177, respectively, is rotatably and slidably mounted on upper leg tube 14 axially in-line with output shaft 200. More particularly, the central portion of input shaft 175 is rotatably and slidably disposed in a bushing 178 which is frictionally fitted in lower opening 163 of the outboard wall of upper leg tube 14. Outboard end 176 of input shaft 175 extends through bushing 178 and out of upper compartment 157. Inboard end 177 of input shaft 175 is slidably and rotatably disposed in a pair of spaced bushings 179a and 179b which are frictionally fitted in cylindrical opening 169 of elongated shaft 173. This telescopic disposition of input shaft 175 within elongated shaft 173 of cluster gear 165 further contributes to the compactness of the gear assembly of third embodiment 150, which results in containment of the entire gear assembly within compartment 157 of upper leg tube 14. Moreover, this cooperation between input shaft 175 and cluster gear 165 serves to stabilize both gear assembly components. A combination gear 180 is formed integrally on the central portion of input shaft 175 disposed in upper compartment 157. Combination gear 180 comprises a pinion gear 181, and a reduced addendum gear used as a spline gear 182 formed integrally with and inboard from pinion gear 181. A transverse continuous cylindrical opening 183 is formed in the central portion of input shaft 175 generally adjacent to and outboard from pinion gear 181. A detent spring 184 having a detent ball 185 disposed on each of its ends is fitted within opening 183 for positively engaging first and second annular recesses 186 and 187, respectively, formed in the interior surface of bushing 178. A transverse continuous cylindrical opening 188 is formed in outboard end 176 of input shaft 175, for receiving a bolt or the like for fastening a crank handle (both not shown) to input shaft 175.

An intermediate shaft 190 having outboard and inboard ends 191 and 192, respectively, is rotatably mounted in upper compartment 157 of upper leg tube 14, directly above and generally adjacent to in-line input and output shafts 175 and 200, respectively. More particularly, outboard and inboard ends 191 and 192 are rotatably disposed in bushings 193 and 194, respectively, which in turn are frictionally fitted in upper openings 162 and 160 formed in the outboard wall of upper leg tube 14 and cover 152, respectively. A gear 195 is formed integrally on outboard end 191 of intermediate shaft 190, and a pinion gear 196 is formed integrally on inboard end 192 of the shaft.

A pair of bent flange plates 205 is attached to an upper inboard portion of upper leg tube 14 in a spaced relationship by any suitable means such as welding. The protruding end of each bent flange plate 205 is formed with a plurality of openings 206 for receiving suitable fastening means such as bolts or the like, for attachment of leg 11 to an outboard surface of a frame of a semitrailer (not shown). It is understood that the curb side leg (not shown) of the landing gear assembly would be mounted on the semitrailer in the same fashion. If it is desired to mount driver's side leg 11 and the curb side leg on an inboard surface of a semitrailer frame, flange plates 205 are attached to an upper outboard portion of upper leg tube 14 in a similar manner. If desired, legs 11 and 12 can each have a pair of flange plates 205 attached to each of the upper inboard and upper outboard portions of the leg, so that each leg of landing gear 150 becomes universal and may be attached either to the outboard or inboard surfaces, respectively, of a semitrailer frame.

The third embodiment 150 of the landing gear for semitrailers of the present invention is operated in the following manner. It is understood that although the structure, arrangement and operation of the double reduction gear assembly of third embodiment landing gear 150 is different than that of first embodiment landing gear 10, the concept of the invention is the same for both embodiments, including the ratios of turns of the crank handle to the vertical distance of travel of the legs of the landing gear and magnitudes of mechanical advantage achieved as described above for landing gear 10, which ratio and magnitude values are fully incorporated by reference herein for the description of landing gear 150. When it is desired to operate landing gear 150 in high gear or high speed, a pushing force is applied to the crank handle for manually slidably moving input shaft 175 to its inwardmost position, wherein detent balls 185 positively engage second annular recess 187 of bushing 178 (FIG. 1A). Such inward movement of input shaft 175 causes spline gear 182 of combination gear 180 to slidably engage spline slot 167 of elongated shaft 173 of cluster gear 165. The crank handle of landing gear 150 and attached input shaft 175 then are manually rotated in the desired direction for raising or lowering upper leg tube 14 with respect to lower leg tube 13 of the driver's side 11 and curb-side legs of the landing gear assembly. Rotation of the crank handle and attached input shaft 175 in the desired direction for retraction or extension of lower leg tube 13 with respect to upper leg tube 14, in turn causes rotation of engaged elongated shaft 173, attached output shaft 200 and attached bevel pinion 172, which in turn meshes with bevel gear 34. It especially should be noted that the teeth of bevel gear 34 nest in the recess of gear 171 to mesh with bevel pinion 172, further contributing to the compactness of the gear assembly and enabling the gear assembly to be generally entirely contained within compartment 157 of upper leg tube 14. The structure, arrangement and operation of the remaining components of landing gear 150 is similar to that described above for landing gear 10, which description has been fully incorporated by reference.

When it is desired to shift to low gear or low speed (FIG. 11), input shaft 175 is manually slidably moved to its outermost position by applying a pulling force to the crank handle, so that detent balls 185 are disengaged from second annular recess 187 and are positively engaged with first annular recess 186. As a result of such outward movement of input shaft 175, attached spline gear 182 disengages from spline slot 167 of elongated shaft 173, and attached pinion gear 181 meshes with gear 195 of intermediate shaft 190, whereby a first reduction occurs in transmitting rotary motion from pinion gear 181 to gear 195. Pinion gear 196 of intermediate shaft 190 remains meshed with gear 171 of cluster gear 165 for achieving a second reduction. The rotation of gear 171 causes corresponding rotation of elongated shaft 165, output shaft 200 and attached bevel pinion 172, which in turn meshes with bevel gear 34. Again, the structure, arrangement and operation of the remaining components of landing gear 150 is similar to that described above for landing gear 10, which description has been fully incorporated by reference. Further, landing gear 150 similarly is more efficient than many known prior art landing gear assemblies, including "constant gear mesh" designs, in part due to the disengagement of pinion gear 181 from gear 195 when the assembly is shifted to high gear, which reduces assembly friction and the like. It should also be noted that positive engagement mechanisms other than spring-biased detent balls could be utilized without affecting the overall concept of the present invention.

A fourth embodiment of the landing gear for semitrailers of the present invention is indicated generally at 220 and is shown in FIGS. 12-15. Fourth embodiment 220 is similar to first embodiment 10 in many respects, excepting the structure, arrangement and operation of the gear assembly used to achieve the double reduction mechanical advantage. The structure, arrangement and operation of the other components of landing gear 220 are similar to those described above for landing gear 10, which description is hereby fully incorporated by reference with regard to landing gear 220.

With regard to the internal components of left or driver's side leg 11, a nut 225 is fixed on the upper end of lower leg tube 13 for threadably receiving a vertical elevating screw shaft 226 (FIGS. 13 and 13A) which includes a threaded lower shaft 224 and a reduced diameter, integral unthreaded upper shaft 227. It is important to note that nut 225 is configured for threadably receiving screw shaft 226 in an orientation which is parallel to and offset in an outboard direction as well as in a forward or rearward direction, from the longitudinal axis of leg 11 (FIG. 14). This positioning of nut 225 and screw shaft 226 contributes to enabling the gear assembly of embodiment 220 to be entirely contained within leg 11, as will be described in greater detail below. It should be noted that an offset screw shaft could be incorporated in third embodiment landing gear 150 described above, to reduce the overall height of leg 11 should a special application require it, without affecting the concept of the invention.

A shoulder 228 is formed at the interface of upper and lower shafts 227 and 224, respectively. An annular collar 229 bears on shoulder 228, and an annular thrust bearing 230 rests on collar 229 about upper shaft 227. A floor base 231 rests on bearing 230 and is disposed about upper shaft 227 which passes through a continuous opening 232 formed in the base. Floor base 231 is welded to the inside surfaces of upper leg tube 14. A hardened thrust washer 233 is disposed on upper shaft 227 and rests on the upper surface of floor base 231. A bevel gear 234 is slidably engaged on upper shaft 227 and rests on washer 233. A pin 235 couples bevel gear 234 to upper shaft 227 in a manner familiar to those of ordinary skill in the art, for transmitting rotary motion to screw shaft 226, as will be described below in the description of the operation of fourth embodiment 220 of the landing gear of the present invention.

Figure 13:
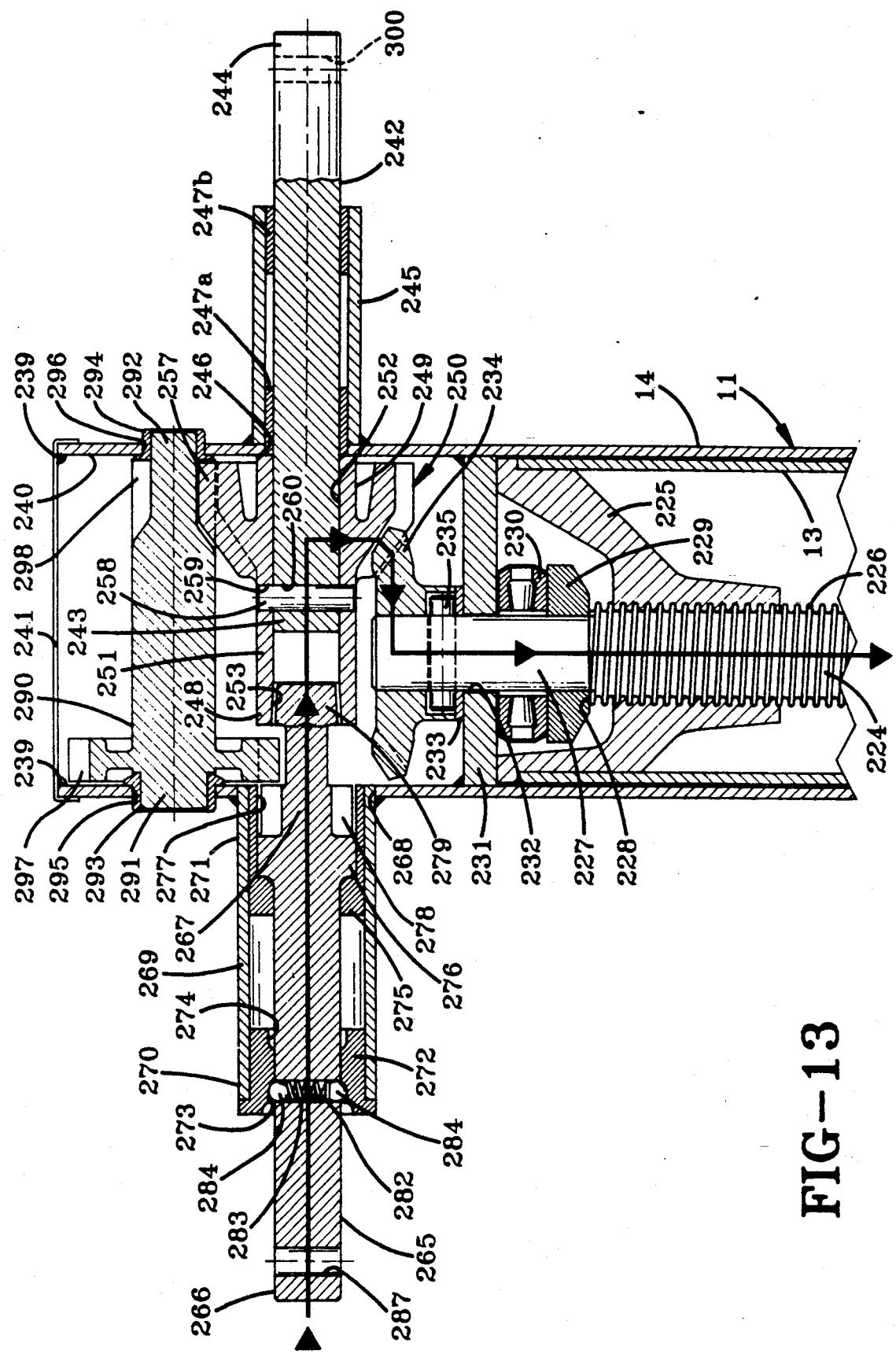
FIG. 13 is a longitudinal sectional view of the two speed gear assembly of FIG. 12, showing the gears engaged in high gear or the high speed position.
Figure 13A:
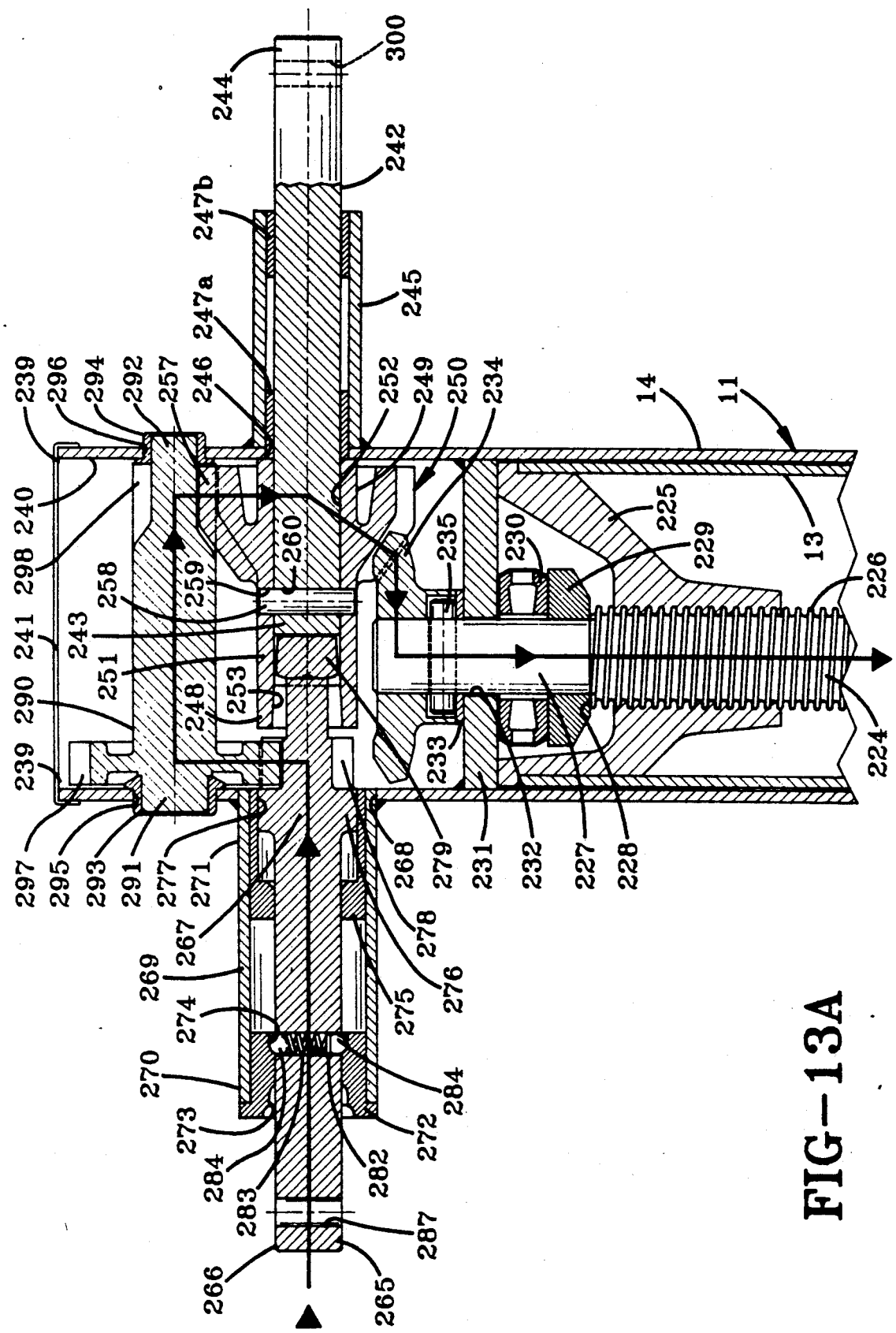
FIG. 13A is a view similar to FIG. 13, showing the gear assembly shifted inwardly and engaged in low gear or the low speed position.
Figure 14:
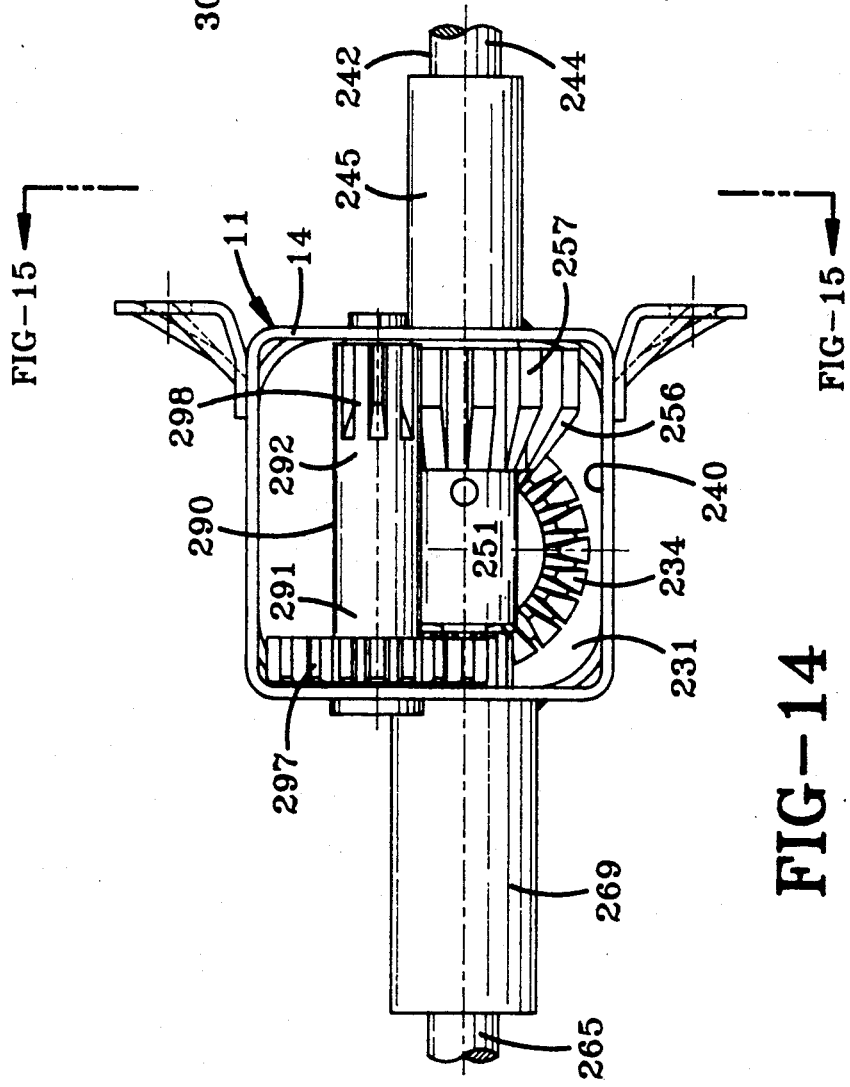
FIG. 14 is a fragmentary top plan view of the gear assembly of FIG. 12 shown in an assembled state.

In accordance with one of the main features of fourth embodiment 220 of the present invention, left or driver's side leg 11 is free of a separate gear case, and instead all of the components of the double reduction gear assembly of fourth embodiment landing gear 220 generally are contained entirely within upper leg tube 14 (FIGS. 13, 13A and 14). A cover 241 encloses the open upper end of upper leg tube 14, and is secured thereon by any suitable means such as self-tapping screws (not shown). Cover 241, together with floor base 231 and the walls of upper leg tube 14, define a compartment 240 of upper leg tube 14 which contains all of the elements of the two speed double reduction gear assembly of fourth embodiment 220. A gasket 239 of any suitable type such as one formed of an elastomeric material, is placed or applied at the interface of cover 241 and upper leg tube 14 in a usual manner. Gasket 239 and cover 241 effectively protect the two speed double reduction gear assembly contained within upper compartment 240 from outside elements such as dirt, moisture, etc., which could interfere with the efficient operation of the assembly. It especially should be noted that containment of all of the components of the double reduction gear assembly within upper leg tube 14 eliminates the need for a separate gear box attached to the upper leg tube as in many prior art landing gear assemblies.

An output shaft 242 having outboard and inboard ends 243 and 244, respectively, is rotatably mounted on upper leg tube 14. More specifically, a sleeve 245 is welded to the exterior surface of the inboard wall of upper leg tube 14 in alignment with an opening 246 formed in the wall. A pair of bushings 247a and 247b is disposed in sleeve 245 in a spaced relationship, and output shaft 242 in turn is rotatably mounted in the bushings, so that outboard end 243 of the shaft extends into compartment 240 and inboard end 244 of the shaft extends out from compartment 240 and sleeve 245.

In accordance with still another of the main features of the present invention, an integrally formed one-piece combination gear member 250 is securely mounted on outboard end 243 of output shaft 242 within compartment 240 of upper leg tube 14. More particularly, gear member 250 comprises an elongated shaft 251 having outboard and inboard ends 248 and 249, respectively, which is formed with a longitudinal continuous cylindrical opening 252, which terminates in a reduced size square-shaped cavity 253 formed in the outboard end of the elongated shaft. Inboard end 249 of elongated shaft 251 includes a bevel pinion 256 and a gear 257 formed integrally therewith, wherein gear 257 is disposed adjacent to and inboard from bevel pinion 256. Bevel pinion 256 meshes with bevel gear 234 of screw shaft 226. Combination gear member 250 is securely mounted on the outboard end 243 of output shaft 242 by a pin 258 which is fitted in aligned, transverse continuous openings 259 and 260 formed in the central portion of elongated shaft 251 and output shaft 242, respectively. It should be noted that cylindrical opening 252 of elongated shaft 251 is substantially occupied by output shaft 242 for stabilizing combination gear member 250 on the output shaft. However, the outboard terminal portion of cylindrical opening 252 and square-shaped cavity 253 are unobstructed by shaft 242, and serve an important function in the operation of landing gear fourth embodiment 250, which will be described in greater detail below.

An input shaft 265 having outboard and inboard ends 266 and 267, respectively, is rotatably and slidably mounted on upper leg tube 14 axially in-line with output shaft 242. More specifically, an opening 268 is formed in the outboard wall of upper leg tube 14 and is aligned with square-shaped cavity 253 of combination gear member 250. A sleeve 269 having outboard and inboard ends 270 and 271, respectively, is welded to the exterior surface of the outboard wall of upper leg tube 14 in alignment with opening 268. A first bushing 272 formed with first and second annular recesses 273 and 274, respectively, in its internal surface, is frictionally fitted in outboard end 270 of sleeve 269, and a second bushing 275 is frictionally fitted in inboard end 271 of sleeve 269. Input shaft 265 is rotatably slidably mounted in bushings 272 and 275. Outboard end 266 of input shaft 265 is formed with an increased diameter boss 276 which rides in an increased diameter cylindrical opening 277 formed in second bushing 275, to stabilize the input shaft, and also to function as a stop in cooperation with second bushing 275 against continued movement of the input shaft in an outboard direction. A pinion gear 278 is formed integrally on input shaft 265 abuttingly adjacent to and inboard from boss 276. Input shaft 265 terminates in an increased diameter pin 279, which is complementary in size and shape to cavity 253 of combination gear member 250. A transverse continuous cylindrical opening 282 is formed in the central portion of input shaft 265. A detent spring 283 having a detent ball 284 disposed on each of its ends is fitted within opening 282 for positively engaging first and second annular recesses 273 and 274, respectively, formed in the interior surface of first bushing 272 disposed in sleeve 269. A transverse continuous cylindrical opening 287 is formed in outboard end 266 of input shaft 265 for receiving a bolt or the like for fastening a crank handle (both not shown) to input shaft 265.

An intermediate shaft 290 having outboard and inboard ends 291 and 292, respectively, is rotatably mounted in upper compartment 240 of upper leg tube 14, and is disposed above, generally adjacent to and offset from in-line input and output shafts 265 and 242, respectively. More particularly, outboard and inboard ends 291 and 292 are rotatably disposed in bushings 293 and 294, respectively, which in turn are frictionally fitted in aligned upper openings 295 and 296 formed in the outboard and inboard walls, respectively, of upper leg tube 14. A gear 297 is integrally formed on outboard end 291 of intermediate shaft 290, and a pinion gear 298 is formed integrally on inboard end 292 of the shaft.

A connecting shaft (not shown) operatively connects output shaft 242 of leg 11 to the input shaft of the curb side leg (also not shown). More specifically, the connecting shaft is operatively connected to output shaft 242 by a bolt (not shown) which is fitted in a pair of opposed openings formed in the end of the connecting shaft and an aligned transverse continuous cylindrical opening 300 formed in inboard end 244 of output shaft 242.

A pair of bent flange plates 305 is attached to an upper inboard portion of upper leg tube 14 in a spaced relationship by any suitable means such as welding. The protruding end of each bent flange plate 305 is formed with a plurality of openings 306 for receiving suitable fastening means such as bolts or the like, for attachment of leg 11 to an outboard surface of a frame of a semitrailer (not shown). It is understood that the curbside leg (also not shown) of the landing gear assembly would be mounted on the semitrailer in the same fashion. If it is desired to mount driver's side leg 11 and the curb-side leg on an inboard surface of the semitrailer frame, flange plates 305 are attached to an upper outboard portion of upper leg tube 14 in a similar manner. If desired, the legs can each have a pair of flange plates 305 attached to each of the upper inboard and upper outboard portions of the leg, so that each leg of landing gear 220 becomes universal and may be attached either to the outboard or the inboard surfaces, respectively, of a semitrailer frame.

The fourth embodiment 220 of the landing gear for semitrailers of the present invention is operated in the following manner. It is understood that although the structure, arrangement and operation of the double reduction gear assembly of fourth embodiment landing gear 220 is different than that of first embodiment landing gear 10, the concept of the invention is the same for both embodiments, including the ratios of turns of the crank handle to the vertical distance of travel of the legs of the landing gear and magnitudes of mechanical advantage achieved as described above for landing gear 10, which ratio and magnitude values are fully incorporated by reference herein for the description of landing gear 220. When it is desired to operate landing gear 220 in high gear or high speed (FIG. 13), input shaft 265 is manually slidably moved to its outermost position by applying a pulling force to the crank handle, so that detent balls 284 are positively engaged with first annular recess 273 of bushing 272. Such outward movement of input shaft 275 causes pinion gear 278 to retract into cylindrical opening 277 of second bushing 275 of sleeve 269, and further causes pin 279 to retract into engagement with complementary cavity 253 of gear member 250. The crank handle and attached input shaft 265 then are manually rotated in the desired direction for raising or lowering upper leg tube 14 with respect to lower leg tube 13 of the driver's side and curb-side legs 11 and 12, respectively. Rotation of the crank handle and attached input shaft 265 in the desired direction for retraction or extension of lower leg tube 13 with respect to upper leg tube 14, in turn causes rotation of attached pin 279 and engaged elongated shaft 251 of combination gear member 250. Elongated shaft 251 rotates integral bevel pinion 256 which in turn meshes with bevel gear 234. The structure, arrangement and operation of the remaining components of landing gear 220 is similar to that described above for landing gear 10, which description has been fully incorporated by reference.

When it is desired to shift to low gear or low speed (FIG. 13A), a pushing force is applied to the crank handle for manually slidably moving input shaft 265 to its inwardmost position, wherein detent balls 284 disengage from first annular recess 273 and positively engage second annular recess 274 of bushing 272. As a result of such inward movement of input shaft 265, pin 279 disengages from cavity 253 of elongated shaft 251, and turns freely in increased size opening 252 of the shaft. Simultaneous with the disengagement of pin 279 from cavity 253 is the inboard movement of pinion gear 278 out of second bushing 275 of sleeve 269 and into upper compartment 240, wherein pinion gear 278 meshes with gear 297, whereby a first reduction occurs in transmitting rotary motion of input shaft 265 from pinion gear 278 through gear 297 and to intermediate shaft 290. Attached pinion gear 298 of intermediate shaft 290 remains meshed with gear 257 of gear member 250 for achieving a second reduction. The rotation of gear 257 causes corresponding rotation of attached bevel pinion 256, which in turn is meshed with bevel gear 234. Again, the structure, arrangement and operation of the remaining components of landing gear 220 is similar to that described above for landing gear 10, which description has been fully incorporated by reference. Further, landing gear 220 similarly is more efficient than many known prior art landing assemblies, including "constant gear mesh" designs, in part due to the disengagement of pinion gear 278 from gear 297 when the assembly is shifted to high gear, which reduces overall assembly friction and the like. It should also be noted that positive engagement mechanisms other than spring-biased detent balls could be utilized without affecting the overall concept of the present invention.

Figure 12:
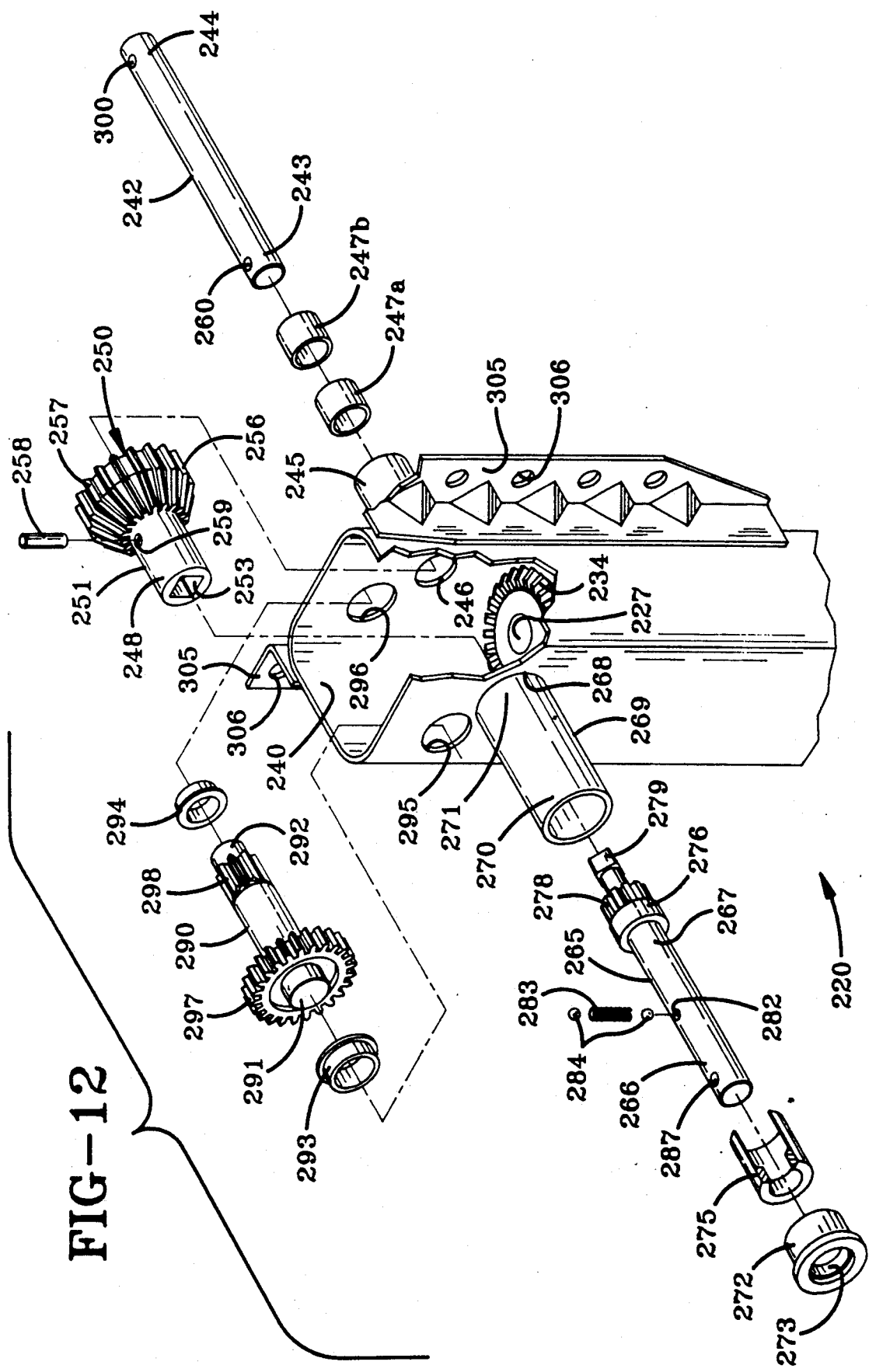
FIG. 12 is an exploded fragmentary perspective view, with portions broken away, of a fourth embodiment of the two speed double reduction gear assembly of the cranking leg of the landing gear of the present invention, shown adapted for mounting on an outboard position on a semitrailer frame.
Figure 15:
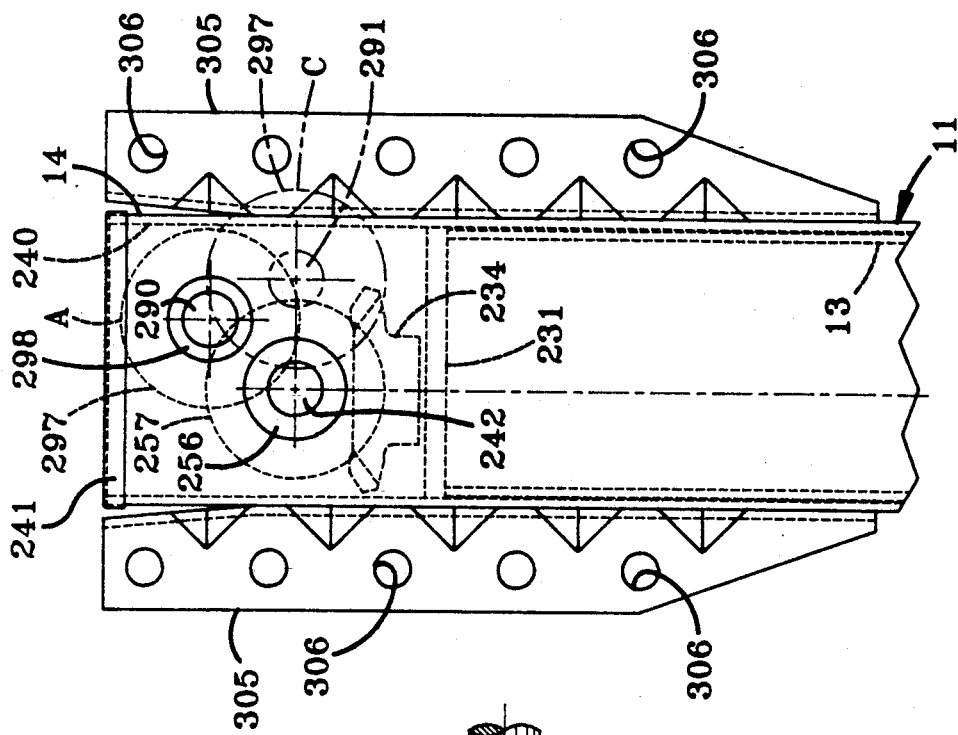
FIG. 15 is a phantom view looking in the direction of arrows 15—15 of FIG. 14, showing the preferred position and an alternative position of the uppermost gear shaft of the gear assembly.

It should be noted that intermediate shaft 290 and attached gears 297 and 298 could also be disposed from the preferred position shown in FIGS. 12, 13 and 14 and denoted as "A" in FIG. 15, to alternate position "C" as shown in FIG. 15 without affecting the concept of the present invention, and in particular, the containment of the entire gear assembly within leg 11 without the need for a separate attached gear box or the like as in many prior art landing gear assemblies.

In summary, important features of the present invention include a landing gear for semitrailers having a two speed double reduction gear assembly, in which the gear assembly is comprised of fewer, smaller and simpler parts mounted on and about in-line input and output shafts, resulting in an easy to manufacture and assemble, compact, low-cost landing gear unit, wherein the double reduction gear assembly is entirely contained in a relatively small gear box, or alternatively within the landing gear leg, thus eliminating the need for a separate gear box. This reduction in the number, size and complexity of parts results in an easy to crank and shift unit having a unique shift-clutching mechanism, which is capable of achieving standard crank handle turn to vertical leg travel distance ratios, wherein the low speed ratio could be fixed within a broad range during manufacture of the unit, if desired, without substantially increasing the overall size or complexity of the two speed double reduction gear assembly. The landing gear of the present invention is durable and simple to use, and can include a universal mounting feature.

While in accordance with the Patent Statutes, the best mode and preferred embodiments have been set forth, the scope of the invention is not limited thereto, but rather by the scope of the attached claims.

What is claimed is:

1. A plural speed trailer support assembly, comprising:
   a) leg means for supporting said trailer, said leg means comprising an upper leg section, a lower leg section, and an elevating mechanism for extending said lower leg section relative to said upper leg section;
   b) axially in-line rotatable input and output shafts for driving said elevating mechanism, said input shaft being axially movable for changing speeds;
   c) gear means for operatively connecting said input and output shafts and said elevating mechanism and for achieving double gear reduction between said input shaft and said output shaft when said input shaft is axially moved to a certain position, for operating said support assembly at a certain speed, said gear means and said elevating mechanism being generally contained within said leg means; and
   d) clutch means for directly coupling said input and output shafts when said input shaft is axially moved to a certain other position, for operating said support assembly at a certain other speed, said elevating mechanism being operatively connected to said output shaft through said gear means when said input shaft is moved to said certain other position.

2. The assembly of claim 1, wherein said gear means is i) a pinion gear formed integrally on the central portion of said input shaft, ii) an intermediate shaft rotatably mounted generally adjacent to said input shaft, said intermediate shaft having a first gear formed integrally on an outboard end of said intermediate shaft and a pinion gear formed integrally on an inboard end of said intermediate shaft, iii) a cluster gear mounted on an inboard end of said input shaft, said cluster gear including an elongated shaft having a first gear formed integrally on the central portion thereof and a bevel pinion formed integrally on said elongated shaft and recessed in said elongated shaft first gear, and iv) a bevel gear mounted on an upper end of an upright elevating screw shaft of said elevating mechanism; wherein said clutch means is v) a spline gear formed integrally on said input shaft inboard from and adjacent to said input shaft pinion gear, and vi) a complementary spline slot formed in a outboard end of said cluster gear elongated shaft, said spline slot communicating with a longitudinal, continuous cylindrical opening formed in said elongated shaft, said cylindrical opening terminating in a reduced diameter, longitudinal continuous cylindrical opening formed in an inboard end of said elongated shaft, whereby said inboard end of said input shaft is telescopically rotatably slidably disposed in the longitudinal, continuous cylindrical opening of said elongated shaft, and an outboard end of said output shaft is mounted in the reduced diameter, longitudinal, continuous cylindrical opening of said elongated shaft; wherein when said landing gear assembly is operated in low speed, said input shaft and attached pinion gear are shifted in an outboard direction and rotated so that said pinion gear becomes meshed with said first gear of said intermediate shaft for rotating said intermediate shaft, said attached pinion gear of said rotating intermediate shaft meshing with said first gear of said cluster gear elongated shaft for rotating said elongated shaft, said operatively connected output shaft and the integral recessed bevel pinion, said rotating bevel pinion meshing with and rotating said bevel gear for rotating said attached elevating screw shaft, said bevel gear being nested in said elongated shaft first gear, so that the ratio of turns of said input shaft to inches of vertical travel of said leg means is from about 20 to about 40; and further wherein when said gear means is shifted to high speed, said input shaft is shifted in an inboard direction so that said input shaft pinion gear disengages from said intermediate shaft first gear and said spline gear engages said elongated shaft spline slot for rotating said elongated shaft, said operatively connected output shaft and said integral bevel pinion, said rotating bevel pinion meshing with and rotating said bevel gear and attached elevating screw shaft, said bevel gear being nested in said elongated shaft first gear, so that the ratio of turns of said input shaft to inches of vertical travel of said leg means is from about 3 to about 4.5.

3. The assembly of claim 2, wherein a crank handle is secured to the outboard end of said input shaft for manual rotation of said shaft; wherein the central portion of said input shaft is formed with a transverse continuous cylindrical opening containing a detent spring and detent balls; wherein a bushing is mounted in an opening formed in an outboard wall of said leg means, said bushing having outboard and inboard annular recesses formed in an internal surface thereof; wherein said outboard and inboard recesses are spaced apart about ⅜ of an inch; wherein said input shaft is slidably rotatably mounted in said bushing and said detent balls engage said outboard and inboard annular recesses when said assembly is in low speed and high speed, respectively; and wherein the ratio of turns of said input shaft to inches of vertical travel of said leg means is from about 25 to about 35 in low speed and from about 4 to about 4.5 in high speed.

4. The assembly of claim 3, wherein said leg means is first and second upright telescopic legs mounted in a laterally spaced relationship generally adjacent to a front end of a semitrailer, said legs each containing an elevating mechanism for extending and retracting said legs; wherein said output shaft is operatively connected to an input shaft rotatably mounted on said second leg; wherein a bevel pinion is mounted on said second leg input shaft; wherein a bevel gear is mounted on an upper end of an upright elevating screw shaft of said second leg elevating mechanism; wherein when said landing gear assembly is operated, said operatively connected second leg input shaft and attached bevel pinion are simultaneously rotated by said rotating output shaft of said first leg, said rotating second leg input shaft bevel pinion meshing with and rotating said second leg bevel gear for rotating said attached second leg elevating screw shaft; wherein a pair of flange plates is mounted in a spaced relationship adjacent to an upper inboard portion of each of said first and second legs for mounting said landing gear assembly on an outboard surface of the semitrailer frame; wherein an access opening is formed in an inboard wall of said first leg, said access opening being closed by a removably mounted cover having upper and lower openings formed therein for locating said intermediate shaft and said cluster gear, respectively; and wherein the ratio of turns of said first leg input shaft to inches of vertical travel of said legs is about 34 to 1 in low speed and about 4.5 to 1 in high speed.

5. The assembly of claim 3, wherein said leg means is first and second upright telescopic legs mounted in a laterally spaced relationship generally adjacent to a front end of a semitrailer, said legs each containing an elevating mechanism for extending and retracting said legs; wherein said output shaft is operatively connected to an input shaft rotatably mounted on said second leg; wherein a bevel pinion is mounted on said second leg input shaft; wherein a bevel gear is mounted on an upper end of an upright elevating screw shaft of said second leg elevating mechanism; wherein when said landing gear assembly is operated, said operatively connected second leg input shaft and attached bevel pinion are simultaneously rotated by said rotating output shaft of said first leg, said rotating second leg input shaft bevel pinion meshing with and rotating said second leg bevel gear for rotating said attached second leg elevating screw shaft; wherein a pair of flange plates is mounted in a spaced relationship adjacent to an upper outboard portion of each of said legs, for mounting said landing gear assembly on an inboard surface of the semitrailer frame; wherein an access opening is formed in an inboard wall of said first leg, said access opening being closed by a removably mounted cover having upper and lower openings formed therein for locating said intermediate shaft and said cluster gear respectively; and wherein the ratio of turns of said first leg input shaft to inches of vertical travel of said legs is about 34 to 1 in low speed and about 4.5 to 1 in high speed.

6. The assembly of claim 1, wherein said gear means is i) a pinion gear formed integrally on an inboard end of said input shaft, ii) an intermediate shaft rotatably mounted generally adjacent to said input shaft, said intermediate shaft having a first gear formed integrally on an outboard end of said intermediate shaft and a pinion gear formed integrally on an inboard end of said intermediate shaft, iii) a combination gear member mounted on an outboard end of said output shaft, said gear member including an elongated shaft having a first gear formed integrally on an inboard end of said elongated shaft and a bevel pinion formed integrally on an inboard end of said elongated shaft adjacent to and outboard from said elongated shaft first gear, and iv) a bevel gear mounted on an upper end of an upright elevating screw shaft of said elevating mechanism; wherein said clutch means is v) an enlarged pin formed integrally on said input shaft inboard from said input shaft pinion gear, and vi) a cavity formed in the outboard end of said elongated shaft of said combination gear member, said cavity being complementary in size and shape to said input shaft pin, said cavity communicating with a longitudinal, continuous enlarged cylindrical opening formed in said elongated shaft whereby said output shaft is mounted in the cylindrical opening of said elongated shaft; wherein when said landing gear assembly is operated in low speed, said input shaft and attached pinion gear are shifted in an inward direction and rotated so that said input shaft pinion gear becomes meshed with said first gear of said intermediate shaft for rotating said intermediate shaft and said input shaft pin turns freely in said cylindrical opening of said elongated shaft, said attached pinion gear of said rotating intermediate shaft meshing with said first gear of said combination gear member for rotating said elongated shaft of said gear member, said operatively connected output shaft and said integral bevel pinion, said rotating bevel pinion meshing with and rotating said bevel gear for rotating said attached elevating screw shaft, so that the ratio of turns of said input shaft to inches of vertical travel of said leg means is from about 20 to about 40; and further wherein when said gear means is shifted to high speed, said input shaft is shifted in an outboard direction so that said input shaft pinion gear disengages from said intermediate shaft first gear and said input shaft enlarged pin engages said cavity of said elongated shaft of said combination gear member for rotating said elongated shaft, said operatively connected output shaft and said integral bevel pinion, said rotating bevel pinion meshing with and rotating said bevel gear and attached elevating screw shaft, so that the ratio of turns of said input shaft to inches of vertical travel of said leg means is from about 3 to about 4.5.

7. The assembly of claim 6, wherein a crank handle is secured to an outboard end of said input shaft for manual rotation of said shaft; wherein the generally central portion of said input shaft is formed with a transverse continuous cylindrical opening containing a detent spring and detent balls; wherein a sleeve is mounted on an exterior surface of an outboard wall of said leg means in alignment with an opening formed in said wall; wherein a bushing is frictionally fitted in said sleeve and is formed with outboard and inboard annular recesses in an internal surface thereof; wherein said outboard and inboard recesses are spaced apart about ⅜ of an inch; wherein said input shaft is slidably rotatably mounted in said bushing and said detent balls engage said outboard and inboard annular recesses when said assembly is in high speed and low speed, respectively; and wherein the ratio of turns of said input shaft to inches of vertical travel of said leg means is from about 25 to about 35 in low speed, and from about 4 to about 4.5 in high speed.

8. The assembly of claim 7, wherein said leg means is first and second upright telescopic legs mounted in a laterally spaced relationship generally adjacent to a front end of a semitrailer, said legs each containing an elevating mechanism for extending and retracting said legs; wherein said output shaft is operatively connected to an input shaft rotatably mounted on said second leg; wherein a bevel pinion is mounted on said second leg input shaft; wherein a bevel gear is mounted on an upper end of an upright elevating screw shaft of said second leg elevating mechanism; wherein when said landing gear assembly is operated, said operatively connected second leg input shaft and attached bevel pinion are simultaneously rotated by said rotating output shaft of said first leg, said rotating second leg input shaft bevel pinion meshing with and rotating said second leg bevel gear for rotating said attached second leg elevating screw shaft; wherein a pair of flange plates is mounted in a spaced relationship adjacent to an upper inboard portion of each of said first and second legs for mounting said landing gear assembly on an outboard surface of the semitrailer frame; wherein said first leg elevating screw shaft is offset from the longitudinal axis of said leg; and wherein the ratio of turns of said first leg input shaft to inches of vertical travel of said legs is about 34 to 1 in low speed and about 4.5 to 1 in high speed.

9. The assembly of claim 7, wherein said leg means is first and second upright telescopic legs mounted in a laterally spaced relationship generally adjacent to a front end of a semitrailer, said legs each containing an elevating mechanism for extending and retracting said legs; wherein said output shaft is operatively connected to an input shaft rotatably mounted on said second leg; wherein a bevel pinion is mounted on said second leg input shaft; wherein a bevel gear is mounted on an upper end of an upright elevating screw shaft of said second leg elevating mechanism; wherein when said landing gear assembly is operated, said operatively connected second leg input shaft and attached bevel pinion are simultaneously rotated by said rotating output shaft of said first leg, said rotating second leg input shaft bevel pinion meshing with and rotating said second leg bevel gear for rotating said attached second leg elevating screw shaft; wherein a pair of flange plates is mounted in a spaced relationship adjacent to an upper outboard portion of each of said legs, for mounting said landing gear assembly on an inboard surface of the semitrailer frame; wherein said first leg elevating screw shaft is offset from the longitudinal axis of said leg; and wherein the ratio of turns of said first leg input shaft to inches of vertical travel of said legs is about 34 to 1 in low speed and about 4.5 to 1 in high speed.

10. A two-speed landing gear assembly for a semitrailer, comprising:
 a) first and second upright telescopic legs mounted in a laterally spaced relationship generally adjacent to a front end of said semitrailer, said legs each containing an elevating mechanism for extending and retracting said legs;
 b) axially in-line, laterally-oriented input and output shafts rotatably mounted on said first leg, said output shaft being operatively connected to an input shaft rotatably mounted on said second leg; and
 c) gear means generally contained within said telescopic legs, for operatively connecting said input and output shafts and said elevating mechanisms, said first leg input shaft being shiftable for operating said gear means and elevating mechanism of said first leg in a high gear at high speed and a low gear at low speed, so that upon shifting said first leg input shaft into low gear a double gear reduction between said input shaft and said output shaft is achieved so that a ratio of turns of said first leg input shaft to inches of vertical travel of said legs of from about 15 to about 50 is achieved, and upon shifting said first leg input shaft into high gear direct coupling of said input and said output shaft is achieved so that a ratio of turns of said first leg input shaft to inches of vertical travel of said legs of from about 2 to about 5 is achieved.

11. The assembly of claim 10, wherein said gear means is i) a pinion gear formed integrally on the central portion of said first leg input shaft, ii) a spline gear formed integrally on said first leg input shaft inboard from and adjacent to said pinion gear, iii) an intermediate shaft rotatably mounted generally adjacent to said first leg input shaft, said intermediate shaft having a first gear formed integrally on an outboard end of said intermediate shaft and a pinion gear formed integrally on an inboard end of said intermediate shaft, iv) a cluster gear mounted on an inboard end of said first leg input shaft, said cluster gear including an elongated shaft having a complementary spline slot formed in an outboard end of said elongated shaft, said spline slot communicating with a longitudinal, continuous cylindrical opening formed in said elongated shaft, said cylindrical opening terminating in a reduced diameter, longitudinal continuous cylindrical opening formed in an inboard end of said elongated shaft, wherein the inboard end of said first leg input shaft is telescopically rotatably slidably disposed in said longitudinal, continuous cylindrical opening of said elongated shaft, and an outboard end of said output shaft is mounted in the reduced diameter, longitudinal, continuous cylindrical opening of said elongated shaft, said elongated shaft further having a first gear formed integrally on the central portion thereof and a bevel pinion formed integrally on said elongated shaft and recessed in said elongated shaft first gear, v) a bevel gear mounted on an upper end of an upright elevating screw shaft of said first leg elevating mechanism, vi) a bevel pinion mounted on said second leg input shaft, and vii) a bevel gear mounted on an upper end of an upright elevating screw shaft of said second leg elevating mechanism; wherein when said landing gear assembly is operated in low gear, said first leg input shaft and attached pinion gear are shifted in an outboard direction and rotated so that said pinion gear becomes meshed with said first gear of said intermediate shaft for rotating said intermediate shaft, said attached pinion gear of said rotating intermediate shaft meshing with said first gear of said cluster gear elongated shaft for rotating said elongated shaft, said operatively connected output shaft and the integral recessed bevel pinion, said rotating bevel pinion meshing with and rotating said bevel gear for rotating said attached first leg elevating screw shaft, the teeth of said bevel gear nesting in said elongated shaft first gear, said operatively connected second leg input shaft and attached bevel pinion being simultaneously rotated by said rotating output shaft, said rotating second leg input shaft bevel pinion meshing with and rotating said second leg bevel gear for rotating said attached second leg elevating screw shaft, so that the ratio of turns of said first leg input shaft to inches of vertical travel of said legs is from about 20 to about 40; and further wherein when said gear means is shifted to high gear, said first leg input shaft is shifted in an inboard direction so that said first leg input shaft pinion gear disengages from said intermediate shaft first gear and said spline plane engages said elongated shaft spline slot for rotating said elongated shaft, said operatively connected output shaft and said integral bevel pinion, said rotating bevel pinion meshing with and rotating said bevel gear and attached first leg elevating screw shaft, said bevel gear being nested in said elongated shaft first gear, said output shaft simultaneously rotating said operatively connected second leg input shaft and attached bevel pinion, said rotating second leg input shaft bevel pinion meshing with and rotating said second leg bevel gear for rotating said attached second leg elevating screw shaft, so that the ratio of turns of said first leg input shaft to inches of vertical travel of said legs is from about 3 to about 4.5.

12. The assembly of claim 11, wherein a crank handle is secured to the outboard end of said first leg input shaft for manual rotation of said shaft; wherein the central portion of said first leg input shaft is formed with a transverse continuous cylindrical opening containing a detent spring and detent balls; wherein a bushing is mounted in an opening formed in an outboard wall of said first leg, said bushing having outboard and inboard annular recesses formed in an internal surface thereof; wherein said outboard and inboard recesses are spaced apart about ¾ of an inch; wherein said first leg input shaft is slidably rotatably mounted in said bushing and said detent balls engage said outboard and inboard annular recesses when said assembly is in low gear and high gear, respectively; and wherein the ratio of turns of said first leg input shaft to inches of vertical travel of said legs is from about 25 to about 35 in low gear and from about 4 to about 4.5 in high gear.

13. The assembly of claim 12, wherein a pair of flange plates is mounted in a spaced relationship adjacent to an upper inboard portion of each of said first and second legs for mounting said landing gear assembly on an outboard surface of the semitrailer frame; wherein an access opening is formed in an inboard wall of said first leg, said access opening being closed by a removably mounted cover having upper and lower openings formed therein for locating said intermediate shaft and said cluster gear, respectively; and wherein the ratio of turns of said first leg input shaft to inches of vertical travel of said legs is about 34 to 1 in low gear and about 4.5 to 1 in high gear.

14. The assembly of claim 12, wherein a pair of flange plates is mounted in a spaced relationship adjacent to an upper outboard portion of each of said legs, for mounting said landing gear assembly on an inboard surface of the semitrailer frame; wherein an access opening is formed in an inboard wall of said first leg, said access opening being closed by a removably mounted cover having upper and lower openings formed therein for locating said intermediate shaft and said cluster gear, respectively; and wherein the ratio of turns of said first leg input shaft to inches of vertical travel of said legs is about 34 to 1 in low gear and about 4.5 to 1 in high gear.

15. The assembly of claim 10, wherein said gear means is i) a pinion gear formed integrally on an inboard end of said first leg input shaft, ii) an enlarged pin formed integrally on said first leg input shaft inboard from said first leg input shaft pinion gear, iii) an intermediate shaft rotatably mounted generally adjacent to said first leg input shaft, said intermediate shaft having a first gear formed integrally on an outboard end of said intermediate shaft and a pinion gear formed integrally on an inboard end of said intermediate shaft, iv) a combination gear member mounted on an outboard end of said output shaft, said gear member including an elongated shaft, said elongated shaft having a cavity formed in its outboard end which is complementary in size and shape to said first leg input shaft pin, said cavity communicating with a longitudinal, continuous enlarged cylindrical opening formed in said elongated shaft, whereby said output shaft is mounted in the cylindrical opening of said elongated shaft, said elongated shaft having a first gear formed integrally on an inboard end of said elongated shaft and a bevel pinion formed integrally on the inboard end of said elongated shaft adjacent to and outboard from said first gear, v) a bevel gear mounted on an upper end of an upright elevating screw shaft of said first leg elevating mechanism, and vi) a bevel pinion mounted on said second leg input shaft, and vii) a bevel gear mounted on an upper end of an upright elevating screw shaft of said second leg elevating mechanism; wherein when said landing gear assembly is operated in low gear, said first leg input shaft and attached pinion gear are shifted in an inward direction and rotated so that said pinion gear becomes meshed with said first gear of said intermediate shaft for rotating said intermediate shaft and said first leg input shaft pin turns freely in said cylindrical opening of said elongated shaft, said attached pinion gear of said rotating intermediate shaft meshing with said first gear of said combination gear member for rotating said elongated shaft of said gear member, said operatively connected output shaft and said integral bevel pinion, said rotating bevel pinion meshing with and rotating said bevel gear for rotating said attached first leg elevating screw shaft, said operatively connected second leg input shaft and attached bevel pinion being simultaneously rotated by said rotating output shaft, said rotating second leg input shaft bevel pinion meshing with and rotating said second leg bevel gear for rotating said attached second leg elevating screw shaft, so that the ratio of turns of said first leg input shaft to inches of vertical travel of said legs is from about 20 to about 40; and further wherein when said gear means is shifted to high gear, said first leg input shaft is shifted in an outboard direction so that said first leg input shaft pinion gear disengages from said intermediate shaft first gear and said input shaft enlarged pin engages said cavity of said elongated shaft of said combination gear member for rotating said elongated shaft, said operatively connected output shaft and said integral bevel pinion, said rotating bevel pinion meshing with and rotating said bevel gear and attached first leg elevating screw shaft, said output shaft simultaneously rotating said operatively connected second leg input shaft and attached bevel pinion, said rotating second leg input shaft bevel pinion meshing with and rotating said second leg bevel gear for rotating said attached second leg elevating screw shaft, so that the ratio of turns of said first leg input shaft to inches of vertical travel of said legs is from about 3 to about 4.5.

16. The assembly of claim 15, wherein a crank handle is secured to an outboard end of said first leg input shaft for manual rotation of said shaft; wherein the generally central portion of said first leg input shaft is formed with a transverse continuous cylindrical opening containing a detent spring and detent balls; wherein a sleeve is mounted on an exterior surface of an outboard wall of said first leg in alignment with an opening formed in said wall; wherein a bushing is frictionally fitted in said sleeve and is formed with outboard and inboard annular recesses in an internal surface thereof; wherein said outboard and inboard recesses are spaced apart about $\frac{3}{4}$ of an inch; wherein said first leg input shaft is slidably rotatably mounted in said bushing and said detent balls engage said outboard and inboard annular recesses when said assembly is in high gear and low gear, respectively; and wherein the ratio of turns of said first leg input shaft to inches of vertical travel of said legs is from about 25 to about 35 in low gear and from about 4 to about 4.5 in high gear.

17. The assembly of claim 16, wherein a pair of flange plates is mounted in a spaced relationship adjacent to an upper inboard portion of each of said first and second legs for mounting said landing gear assembly on an outboard surface of the semitrailer frame; wherein said first leg elevating screw shaft is offset from the longitudinal axis of said leg; and wherein the ratio of turns of said first leg input shaft to inches of vertical travel of said legs is about 34 to 1 in low gear and about 4.5 to 1 in high gear.

18. The assembly of claim 16, wherein a pair of flange plates is mounted in a spaced relationship adjacent to an upper outboard portion of each of said legs, for mounting said landing gear assembly on an inboard surface of the semitrailer frame; wherein said first leg elevating screw shaft is offset from the longitudinal axis of said leg; and wherein the ratio of turns of said first leg input shaft to inches of vertical travel of said legs is about 34 to 1 in low gear and about 4.5 to 1 in high gear.

* * * * *